United States Patent
Tracy et al.

(10) Patent No.: US 9,365,365 B2
(45) Date of Patent: Jun. 14, 2016

(54) WOOD VENEER DIVERTER AND PROCESSING SYSTEM

(71) Applicant: Ventek, Inc., Eugene, OR (US)

(72) Inventors: Jason W. Tracy, Albany, OR (US); Thomas B. Thompson, Springfield, OR (US)

(73) Assignees: Ventek, Inc., Eugene, OR (US); Ventek Machinery Group, LLC, Eugene, OR (US)

( * ) Notice: Subject to any disclaimer, the term of this patent is extended or adjusted under 35 U.S.C. 154(b) by 0 days.

(21) Appl. No.: 14/339,317

(22) Filed: Jul. 23, 2014

(65) Prior Publication Data
US 2014/0339047 A1 Nov. 20, 2014

Related U.S. Application Data

(62) Division of application No. 13/223,090, filed on Aug. 31, 2011, now Pat. No. 8,813,947.

(51) Int. Cl.
*B65G 47/82* (2006.01)
*B65G 15/50* (2006.01)
*B65G 15/58* (2006.01)
*B65G 47/36* (2006.01)
*B07C 5/14* (2006.01)

(52) U.S. Cl.
CPC . *B65G 47/82* (2013.01); *B07C 5/14* (2013.01); *B65G 15/50* (2013.01); *B65G 15/58* (2013.01); *B65G 47/36* (2013.01); *B65G 2201/0282* (2013.01)

(58) Field of Classification Search
CPC ........ B65G 15/04; B65G 15/58; B65G 15/12; B65G 15/42; B65G 15/50; B65G 21/2036; B65G 47/36; B65G 47/62; B65G 47/61; B65G 47/68; B65G 47/82; B65G 2201/0282; B07C 5/14
USPC .................................... 198/692, 693, 370.08
See application file for complete search history.

(56) References Cited

U.S. PATENT DOCUMENTS

| | | | |
|---|---|---|---|
| 1,718,150 | A | 6/1929 | Hurxthal et al. |
| 1,962,980 | A | 6/1934 | Buckner |

(Continued)

FOREIGN PATENT DOCUMENTS

| | | |
|---|---|---|
| CN | 101524862 A | 9/2009 |
| EP | 1775247 A1 | 4/2007 |

(Continued)

OTHER PUBLICATIONS

Provisional patent application entitled Veneer Sorting Device, inventors Jason Tracy and Kory Borgessan.

(Continued)

*Primary Examiner* — Leslie A Nicholson, III
*Assistant Examiner* — Keith R Campbell
(74) *Attorney, Agent, or Firm* — Klarquist Sparkman, LLP

(57) ABSTRACT

A wood veneer diverter system comprises a plurality of veneer diverters operable to divert veneer downwardly and away from a belt based on the category or grade of the veneer. These veneer diverters are desirably rotated so that they pass through a veneer flow path in the direction of veneer flow. The veneer diverters may be configured to enhance their effectiveness in diverting veneer away from belts that move the veneer.

21 Claims, 14 Drawing Sheets

(56) References Cited

U.S. PATENT DOCUMENTS

| | | | |
|---|---|---|---|
| 3,280,866 A | 10/1966 | Erickson | |
| 3,321,066 A | 5/1967 | Christianson | |
| 3,447,579 A | 6/1969 | Dodge | |
| 3,483,780 A | 12/1969 | Hudson | |
| 3,566,937 A | 3/1971 | Erickson | |
| 4,161,092 A | 7/1979 | Buday et al. | |
| 4,162,726 A * | 7/1979 | Hudson | A01B 45/045 172/20 |
| 4,682,904 A | 7/1987 | Yoshimura et al. | |
| 4,732,067 A | 3/1988 | Yamada | |
| 4,765,214 A | 8/1988 | Nakaya | |
| 4,867,299 A | 9/1989 | Fukuoka et al. | |
| 4,934,228 A | 6/1990 | Bolton et al. | |
| 5,013,211 A | 5/1991 | Nakaoda et al. | |
| 5,022,336 A | 6/1991 | Iwase | |
| 5,123,807 A | 6/1992 | Nakaoda et al. | |
| 5,573,121 A * | 11/1996 | McKay | B07C 5/362 209/518 |
| 5,653,430 A | 8/1997 | Kawai | |
| 5,669,602 A | 9/1997 | Ito | |
| 5,826,481 A | 10/1998 | Sintonen | |
| 6,338,484 B1 | 1/2002 | Puranen et al. | |
| 6,526,856 B2 | 3/2003 | Newnes | |
| 6,595,739 B1 * | 7/2003 | LaPlace | B65B 25/06 198/689.1 |
| 7,063,500 B1 | 6/2006 | Takahashi | |
| 2003/0062440 A1 | 4/2003 | Ohshio et al. | |
| 2005/0050875 A1 | 3/2005 | Alsobrook et al. | |
| 2006/0118389 A1 | 6/2006 | Henley | |
| 2013/0048471 A1 | 2/2013 | Capps, Jr. | |

FOREIGN PATENT DOCUMENTS

| | | |
|---|---|---|
| FR | 1255655 | 1/1961 |
| JP | 2-143801 | 6/1990 |
| JP | 6-55506 | 3/1994 |
| JP | 11-179708 | 7/1999 |
| JP | 2004-82666 | 3/2004 |
| JP | 2007-326320 | 12/2007 |
| JP | 2009-160834 | 7/2009 |
| JP | 2010-105331 | 5/2010 |
| WO | WO 92/15403 | 9/1992 |

OTHER PUBLICATIONS

Allowed claims of U.S. Appl. No. 13/223,090, the parent to the present application.

International Search Report and Written Opinion of the International Searching Authority for PCT/US2012/052474, mailed Nov. 28, 2012.

* cited by examiner

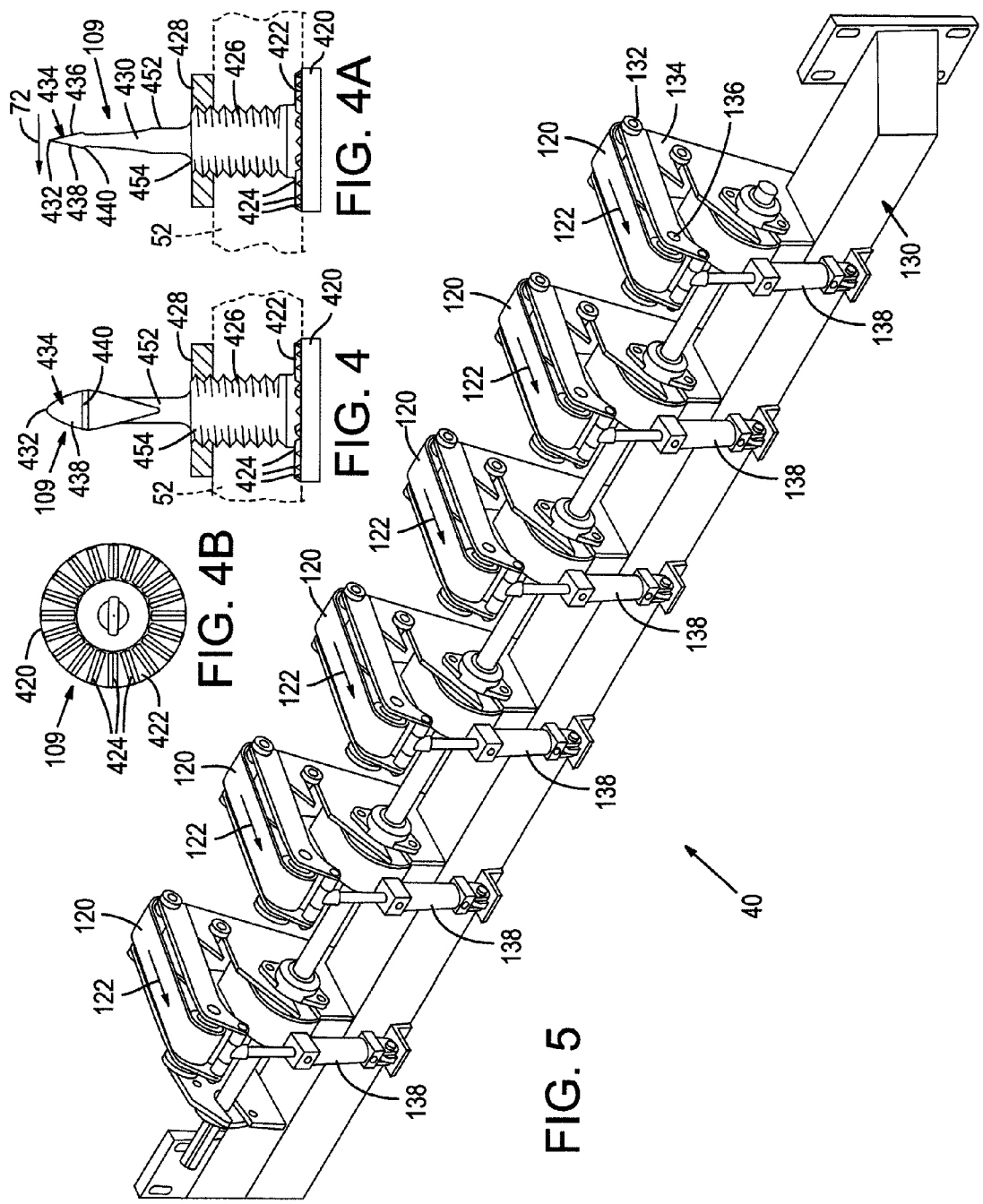

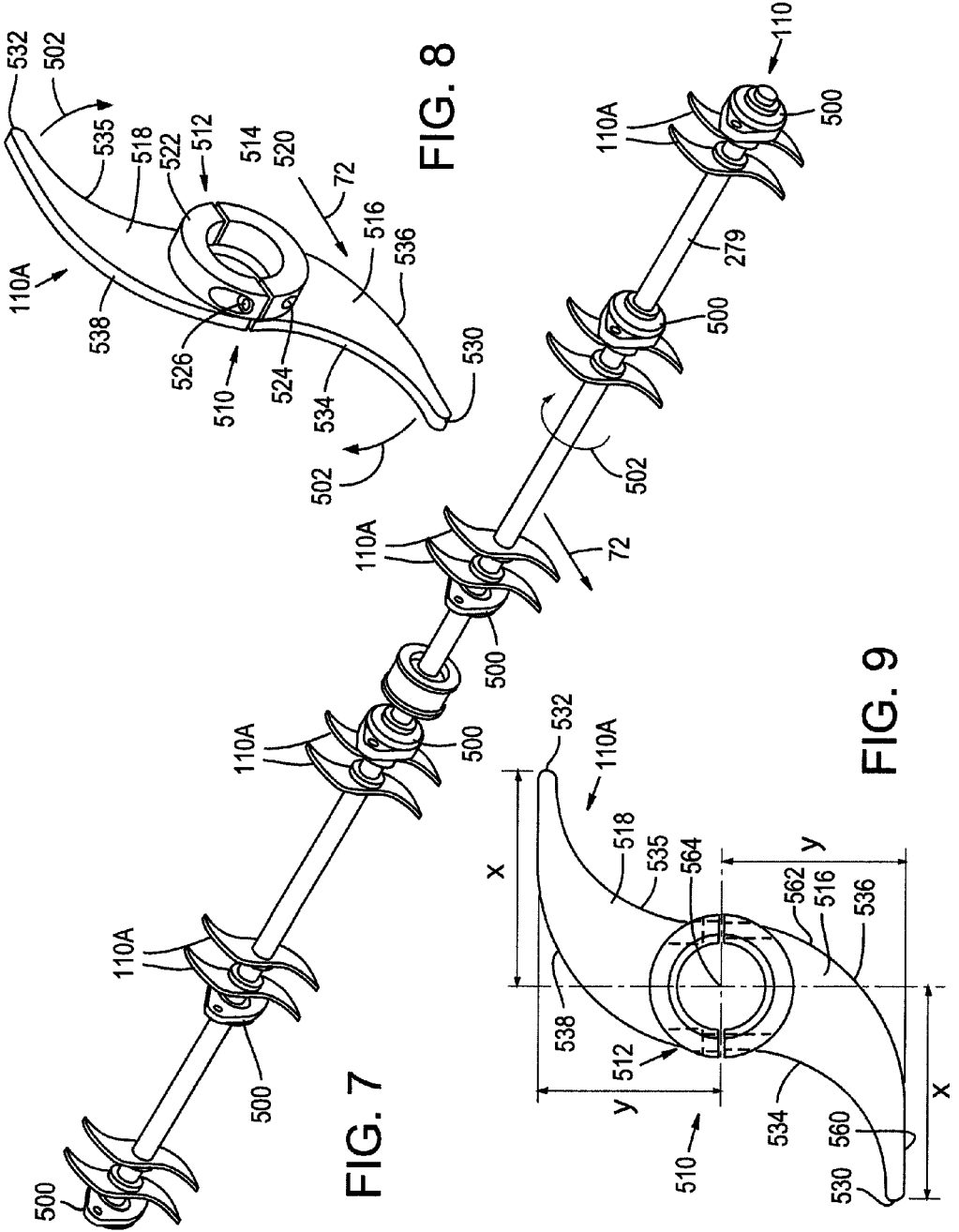

WOOD VENEER DIVERTER AND PROCESSING SYSTEM

CROSS REFERENCE TO RELATED APPLICATION

This application is a Divisional of U.S. application Ser. No. 13/223,090, entitled WOOD VENEER DIVERTER AND PROCESSING SYSTEM, filed on Aug. 31, 2011.

TECHNICAL FIELD

This disclosure relates to the handling of wood veneer peeled from a log and one aspect relates to a veneer diverter for sorting veneer into various veneer categories.

A typical green veneer line is comprised of a lathe, transport trays, a clipper scanner, a clipper, a veneer sheet diverter, a veneer sheet stacker, strip trays, a manual pull conveyor, and a trash haulback conveyor.

The lathe peels a layer off of a log at a given peel thickness (such as, in one example, an approximately 1/8" thick veneer ribbon) until the log diameter is reduced to a "core" size limit. At that point, the core is removed from the lathe and a new log is inserted for peeling. The veneer ribbon is the approximately 1/8" thick peel (in one example) from the log and for most of the peel is the same width as the log (usually 102+/− inches when to be used in 4 foot×8 foot plywood to allow for some trim). The length of the ribbon is dependent on the number of revolutions of the log required to reduce the original log diameter to the core diameter, removing 2 times the peel thickness from the diameter on each revolution. This veneer ribbon then travels down a belt conveyor toward the clipper scanner.

The clipper scanner looks at the ribbon with a camera. The image is processed by a computer to find defects in the veneer such as bark, voids where there is no wood, splits, knots, etc. The computer determines where to clip the ribbon so as to maximize the value of the resulting pieces of veneer cut from the ribbon. The location of the cuts or clips can depend upon the criteria established by each individual mill, but the resulting cuts can produce different types or categories of material. These material types can be designated as trash, fishtail, random, and full sheets. There can be other types and subtypes of each of the main material types (e.g., sapwood), but in one example the sorting of veneer into four subtypes is desirable. "Trash" is veneer that is not usable in the making of plywood and is typically transported to a hog shredder to be made into wood chips. "Fishtail" are pieces of veneer where there is not enough wood (e.g., less than approximately 102" for 4'×8' plywood sheets) along the grain direction to use in the long direction of plywood (the 8' direction for 4'×8' plywood), but enough wood (approximately 51", when to be used in 4'×8' plywood) to cut the piece such that it can be used as plywood core in the short direction of the plywood (the 4' direction in 4'×8' plywood). "Random" are veneer pieces that are full length of the peel in the long (e.g., the 102" direction for 4'×8' plywood), but less than a full sheet width (e.g., approximately 54" in the case of 4'×8' plywood, to allow for trim) in the other direction. "Full sheets" are veneer pieces that span a full sheet of plywood and, for 4'×8' plywood, are nominally 54" wide by a full length of nominally 102". The clips are in the wood grain direction and in a direction perpendicular to the width direction of the veneer (e.g., 54" wide for veneer for 4'×8' plywood, less than 54" wide for random). Fishtail veneer can be any width up to a full sheet width, and trash veneer can be any width depending on the defects that need to be removed.

After the pieces are clipped, in one known approach, the clipped material runs out of the clipper onto a beltway, and pieces of veneer are picked out of the material stream using a diverter. The pieces are sorted by the diverter onto respective beltways according to the type of material.

Although veneer diverter sorters exist, a need exists for improvements in veneer handling systems, in diverters for such systems as well as in components of such diverters, and in methods of diverter operation.

SUMMARY

In accordance with one aspect of this disclosure, a wood veneer handling system comprises a veneer diverter system operable to divert veneer traveling in a veneer flow path from belts. The veneer is held in engagement with the belts, for example by vacuum drawing the veneer against the belts or spikes on the belts that impale the veneer. The veneer travels along the underside of the belts and is selectively diverted by veneer engaging diverters downwardly and away from the belts depending upon the category or grade of the veneer. Conveyors can be used to transport the diverted veneer away from the diverter system. Desirably there are plural sets of veneer engaging diverters with each set being positioned for rotation about a respective axis that is positioned above the veneer flow path. The diverters of the set are rotated about their respective axes and are moved into position such that a veneer engaging surface portion of the diverters engage the veneer to divert the veneer from the belt. The sets of diverters can be spaced apart in the veneer flow direction from one another with, for example, a first set of diverters being positioned at an upstream location in the veneer flow path, a second set of diverters being positioned downstream from the first set of diverters, a third set of diverters being positioned downstream from the second set of diverters, and a fourth set of diverters being positioned downstream from the third set of diverters. More or fewer sets of diverters can be used.

The first set of diverters can be selectively moved into the veneer flow path and stopped to be in a position to divert trash veneer away from the belt. The second set of diverters can be selectively moved into and stopped in the veneer flow path to divert fishtail veneer from the belts with the first set of diverters being moved out of the veneer flow path to permit the passage of the fishtail veneer to the second set of diverters. The third set of diverters can be selectively moved into and stopped in the veneer flow path to divert random veneer from the veneer flow path. In this example, the first and second diverters would have been moved out of the veneer flow path to allow the random veneer to bypass the first and second set of diverters for diversion from the belts by the third set of diverters. In the event full sheets of veneer are carried by the belts, the first, second and third sets of diverters can be moved out of the veneer flow path to allow the full sheets of veneer to pass to a sorting area. A fourth set of diverters, downstream from the third set of diverters, can be selectively moved into the veneer flow path and stopped to divert selected full sheets of veneer away from the belts or out of the veneer flow path to allow full sheets of veneer that are not to be sorted by the fourth set of diverters to reach another location. For example, the fourth set of diverters can be used to further sort full sheets of veneer such as separating wetter sapwood veneer from dryer heart wood veneer. Additional diverters can also be included in the event further sorting is desired.

Each set of diverters can comprise a plurality of diverters positioned between each pair of veneer moving belts. In addition, the diverters can be configured to enhance their ability to selectively separate one piece of veneer from the belts even when the belts are moving at a relatively high speed and said one piece of veneer is positioned extremely close to another piece of veneer traveling adjacent to the one piece of veneer along the belt. In one desirable form, the diverters are shaped to enter the veneer flow path at an angle between 75 degrees and 105 degrees with a desirable angle of entry being approximately 90 degrees. As another aspect of an embodiment, the diverters can comprise at least one projection with a veneer engaging surface that does not lie entirely in a single plane. For example, the veneer engaging surface can comprise a convex portion positioned to engage veneer traveling in the veneer flow direction when a projecting portion of the diverter enters the veneer flow path and is stopped in the veneer flow path. The diverter projection can comprise a second surface opposite to the veneer engaging surface which comprises a concave portion. In a particularly desirable form, the diverters comprise a generally "S" shape diverter body and can comprise a central mount portion for coupling to a diverter mounting shaft. The projecting portion of the diverter can comprise a cusp or half crescent shaped projection.

In accordance with another aspect of an embodiment, the diverter system can comprise a diverter body supported by a frame. The diverter body can be coupled by rolling supports to diverter body supporting portions of the frame. In addition, the diverter body can be moved relative to the frame by applying a force between the frame and the diverter body to cause rolling of the diverter body along the supporting portions. Desirably the diverter body is movable away from a veneer clipper positioned adjacent to an entrance portion of the diverter body. The supporting portions can comprise respective upwardly sloped ramps positioned to engage respective rolling support rollers with the diverter body being moved such that the rollers climb upwardly along their respective associated ramps to raise the diverter body as it moves away from the veneer clipper. This provides enhanced access to the veneer clipper. One or more toothed retainers or stops with respective roller engaging recesses can be mounted to the frame and positioned to engage a respective roller as the diverter body is moved upwardly and away from the clipper to resist downward movement of the diverter body until such time as the one or more stops are released.

As a further aspect of an embodiment, a pinch belt assembly can be positioned adjacent to the entrance end of the diverter body with the pinch belt assembly being pivotally supported for movement between a first clearance position away from a clipper to provide access to the clipper and an operational position toward the clipper. The pinch belts of the pinch belt assemblies can also be movable between first and second positions. When in the first position and the pinch belt assembly is in its operational position, the pinch belts are positioned to urge veneer against the diverter belts. When in the second position, the pinch belts are spaced from the veneer moving belts to, for example, allow a jam up of veneer to pass.

As yet another aspect of an embodiment, a scanner can provide veneer scan signals to a scanner controller that can control the operation of a clipper to control the timing of clipping veneer. The scanner controller can also provide diverter control signals to a diverter controller to control the timing of the operation of diverter motors and associated diverters to divert veneer. The diverter controller can control diverter motors to control the positioning of the respective sets of diverters and thereby the diversion of the different grades of veneer from the diverter belts in response to the scanner provided diverter control signals. The diverter controller can also comprise controls for controlling the operation of a motor or other drive mechanism that drives the diverter belts.

More detailed aspects of respective embodiments are summarized below. It being understood that the invention encompasses all novel and non-obvious aspects of this disclosure including in various combinations and sub-combinations with one another. There is no requirement that an invention as disclosed herein includes all features or accomplishes all advantages of the various embodiments disclosed below.

In accordance with one embodiment, a wood veneer handling system comprises a frame; a diverter body coupled to the frame, the diverter body comprising top and bottom portions, first and second end portions and first and second side portions; a plurality of veneer transporting diverter belts coupled to a diverter body and supported for travel in a veneer flow direction along the bottom portion of the diverter body from the first end portion of the diverter body toward the second end portion of this diverter body, and operable to move pieces of veneer held in engagement with the belts along the bottom portion of the diverter body in a veneer flow path in the veneer flow direction with the travel of the belts, the belts being spaced apart transversely relative to the veneer flow direction; and at least one set of plural spaced apart veneer engaging diverters, the one set of veneer engaging diverters being rotatably coupled to the diverter body for rotating about a first diverter axis that is transverse to the veneer flow direction, the first diverter axis being positioned above the veneer flow path, wherein each veneer engaging diverter comprises at least one diverter projection rotatable into, stoppable within, and rotatable out of the veneer flow path, the diverter projection rotating in the veneer flow direction in the veneer flow path, the diverter projection being operable such that, when the diverter projection is stopped in the veneer flow path and engages a piece of veneer traveling in the veneer flow direction, the diverter projection diverts the engaged piece of veneer from the belts and out of the veneer flow path. In this embodiment, the diverter projection can comprise a veneer engaging surface that does not lie entirely in a single plane. As an alternative aspect, there can be plural veneer engaging diverters between each veneer transporting belt. The veneer engaging surfaces can comprise a convex portion positioned to engage veneer traveling in the veneer flow direction when the diverter projection is stopped in the veneer flow. The diverter projection can also comprise a second surface opposite to the veneer engaging surface, the second surface comprising a concave portion.

In accordance with an embodiment, the veneer diverters can each comprise at least two diverter projections with each diverter projection comprising a distal end portion and being configured such that the angle of entry between the veneer engaging surface at the distal end portion of each diverter projection and the veneer flow path is between 75 degrees and 105 degrees, and desirably approximately 90 degrees, or 90 degrees, when the distal end portion rotates into the veneer flow path.

In accordance with yet another aspect of an embodiment, veneer diverters can comprise a generally S-shaped diverter body comprising first and second diverter projections. The diverter body can be in plural sections with, for example, a portion of a shaft mount coupled to each section. As a more specific aspect of an embodiment, the veneer diverters can comprise first and second cusp or half crescent projections.

As a further aspect of an embodiment, a veneer diverter system can comprise at least first, second, and third diverter support shafts rotatably supported by the diverter body, the first diverter support shaft being rotatable about the first diverter axis, the second and third support shafts being supported by the diverter body for rotation about respective second and third diverter axes that are transverse to the veneer flow direction, the second and third diverter axes being positioned above the veneer flow path and being spaced apart from one another in the veneer flow direction, the at least one set of plural spaced apart veneer engaging diverters comprising a first set of plural spaced apart veneer diverters mounted to the first diverter support shaft for rotating about the first diverter axis, a second set of plural spaced apart veneer diverters mounted to the second diverter support shaft for rotating about the second diverter axis, and a third set of plural spaced apart veneer diverters mounted to the third shaft for rotating about the third diverter axis, the second set of veneer diverters being positioned downstream in the veneer flow direction from the first set of the veneer diverters, and the third set of veneer diverters being positioned downstream in the veneer flow direction from the second set of veneer diverters, a first diverter shaft motor coupled to the first diverter shaft and operable to selectively rotate the first diverter shaft to rotate the first set of veneer diverters in the veneer flow direction into and out of the veneer flow path, a second diverter shaft motor coupled to the second diverter shaft and operable to selectively rotate the second diverter shaft to rotate the second set of veneer diverters in the veneer flow direction into and out of the veneer flow path, and a third diverter shaft motor coupled to the third diverter shaft and operable to selectively rotate the third set of veneer diverters in the veneer flow direction into and out of the veneer flow path. One or more additional sets of diverters, diverter support shafts and diverter shaft motors can also be included.

As yet another aspect of an embodiment, the first, second and third diverter shaft motors can be responsive to diverter motor control signals from a diverter controller to rotate the respective first, second, and third sets of veneer diverters into and out of the veneer flow path. Desirably, the diverter motor control signals control diverter motors to control the position of the diverters so that the diverters divert and sort the different categories of veneer (e.g., corresponding to veneer pieces categorized as one of first, second, third or fourth grades (such as trash veneer, fishtail veneer, random sized veneer or full width veneer). A scanner is operational to scan veneer and determine the grade of the scanned veneer as well as the location to clip the veneer to, for example, optimize the grade. The scanner can comprise a scanner controller that can track the location of the edges of veneer clips and the grade of clipped pieces of veneer. When the scanner controller has determined that a piece of veneer that is "better than a first grade" (e.g., "better than trash grade") is reaching the first set of diverters, in response to a corresponding diverter control signal from the scanner controller, the diverter controller causes the first set of diverters (first or trash grade diverters in this example) to be rotated by the first diverter motor out of the veneer flow path if not already out of the veneer flow path. The first set of diverters remain out of the veneer path until such time as the piece of veneer reaching the first set of diverters is no longer better than the first grade and, in response to a corresponding diverter control signal from the scanner, the diverter controller causes the first set of diverters to be rotated by the first diverter motor into the veneer flow path, or retained in the veneer flow path if already in the veneer flow path, such that the first set of diverters divert veneer categorized as first grade veneer [no longer "better than first grade" (e.g., no longer "better than trash grade")] downwardly from the belt and away from the veneer flow path. In addition, when the scanner controller has determined that a piece of veneer of a "better than second grade" (e.g., better than fishtail grade) is reaching the second set of veneer diverters, in response to a corresponding diverter control signal, the diverter controller causes the second set of diverters (second grade or fishtail grade diverters in this example) are rotated by the second diverter motor out of the veneer flow path if not already out of the veneer flow path. The second set of diverters remain out of the veneer flow path until such time as the piece of veneer reaching the second set of diverters is no longer "better than second grade" and, in response to a corresponding diverter control signal from the scanner controller, the diverter controller causes the second set of diverters to be rotated by the second diverter motor into the veneer flow path, or retained in the veneer flow path if already in the veneer flow path, such that the second set of diverters divert veneer categorized as second grade veneer [no longer "better than second grade" veneer (e.g., no longer "better than fishtail grade" veneer)] downwardly from the belt and away from the veneer flow path. When the scanner controller has determined that a piece of veneer of a "better than third grade" (e.g., better than random grade) is reaching the third set of veneer diverters, in response to a corresponding diverter control signal, the diverter controller causes the third set of diverters (third grade or random grade diverters in this example) to be rotated by the third diverter motor out of the veneer flow path if not already out of the veneer flow path. The third set of diverters remain out of the veneer flow path until such time as the piece of veneer reaching the third set of diverters is no longer "better than third grade" (e.g., no longer better than random grade) and, in response to a corresponding diverter control signal from the scanner controller, the diverter controller causes the third set of diverters to be rotated by the third diverter motor into the veneer flow path, or retained in the veneer flow path if already in the veneer flow path, such that the third set of diverters divert veneer categorized as third grade veneer [no longer "better than third grade" veneer (e.g., no longer better than random grade)] downwardly from the belt and away from the veneer flow path.

From the above description it should be understood that full sized grade veneer sheets that are traveling along the belt typically would be "better than first grade", "better than second grade", and "better than third grade" so that each of the first, second and third sets of diverters would be out of the path of veneer travel so that such highly graded full sized sheets of veneer can pass the first, second and third diverters to their associated sorting area. Likewise, if a third grade (e.g., better than fishtail grade) piece of veneer is traveling along the belts, the first and second sets of diverters will be moved out of the way, if not already out of the way, to allow the third grade piece of veneer to pass to the third set of diverters for diversion by the third set of diverters. Similarly, if a second grade piece of veneer (e.g., better than trash grade) is traveling along the diverter belts, the first set of diverters will be moved out of the veneer flow path, or remain out of the veneer flow path if already out of the path, to allow the second grade veneer to reach the second set of diverters where it is diverted. If the veneer is first grade, such as trash veneer, it will not be "better than first grade" and will be diverted by the first set of diverters. If, in addition, further sorting of the "better than third grade" full sized sheets of veneer is desired, in this example, the full sized sheets can be categorized for sorting by additional grade categories (e.g., a fourth grade can correspond to full sized sheets with certain sized knots or quantities of knots and a fifth grade can correspond to full sized sheets with lesser sized knots). Other sort categories can also be used and more sets of diverters can be used. In this case, when the scanner controller has determined that a piece of veneer of a "better than fourth grade" is reaching a fourth set of veneer diverters, in response to a corresponding diverter control signal, the diverter controller causes the fourth set of diverters to be rotated by a fourth diverter motor out of the veneer flow path if not already out of the veneer flow path. The fourth set of diverters can remain out of the veneer flow path until such time as the piece of wood veneer reaching the fourth set of diverters is no longer "better than fourth grade" (meaning it would be fourth grade in this example), and, in response to a corresponding diverter control signal from the scanner controller, the diverter controller causes the fourth set of diverters to be rotated by the fourth diverter motor into the veneer flow path, or retained in the veneer flow path if already in the veneer flow path, such that the fourth set of diverters divert veneer categorized as fourth grade downwardly and away from the veneer flow path. In the above example, lower grades of veneer are sorted out before higher grades of veneer. Although desirable, the sorting can be accomplished in other orders (e.g., the first through fifth grades do not need to be in ascending grade quality).

As another aspect of an embodiment, a wood veneer handling system can comprise a veneer scanner at an upstream location relative to the veneer flow direction from the diverter body and a veneer clipper intermediate to the veneer scanner and diverter body, the veneer flow path passing adjacent to the scanner such that veneer is positioned for scanning by the scanner, the scanner comprising a scanner controller coupled and operable to provide veneer clip signals to the veneer clipper to control cutting of veneer by the clipper and operable to receive signals from the clipper indicating the location of clipping of the veneer, the scanner controller also providing diverter control signals for controlling the timing of operation of the various sets of diverters to sort the categories of veneer such as categories determined by the scanner controller from veneer scans, a diverter controller coupled to the scanner controller, the diverter controller also being coupled to the first, second and third diverter motors to control the diverter motors to control the movement of the veneer diverters in response to the diverter control signals, a belt mover controlled by the diverter controller and operable to move the belts such that the belts travel in the first veneer flow direction along the bottom portion of the diverter body in response to operation of the belt mover, belt speed information being communicated to the scanner controller such that the scanner controller is operable to track the position of the leading edge of the veneer clipped by the clipper along the veneer flow path with the scanner controller sending diverter control signals to the diverter controller indicating the timing at which the respective sets of diverters are to be rotated into the veneer flow path by the diverter motors in response to the diverter control signals, the diverter controller sending diverter motor control signals to cause the respective diverter motors to move the respective sets of veneer diverters into and out of the veneer flow path.

As yet another aspect of a veneer handling system comprising such sets of diverters, there can be at least one material conveyer associated with each set of diverters and positioned to receive material diverted from the veneer flow path by the associated diverters.

As yet another aspect of an embodiment, the bottom portion of the diverter body can be of a concave arcuate shape such that the veneer flow path curves upwardly in a direction from the first to the second end portions of the diverter body.

As a further aspect of an embodiment, a pinch belt assembly can be positioned at the first end portion of the diverter body and can comprise plural pinch belts positioned to urge veneer against veneer transporting diverter belts at least when the pinch belt assembly is in a first position. The pinch belts can be movable toward and away from the veneer transporter veneer diverter belts. The pinch belt assembly can be pivotally supported for pivoting movement between a clearance position providing greater access to a veneer clipper and an operational position.

As a still further aspect of an embodiment, first and second sets of suspension supports can extend upwardly from the top portion of the diverter body. The first set of suspension supports can be positioned nearer to the first end portion of the diverter body than the second end portion of the diverter body and the second set of suspension supports can be positioned nearer to the second end portion of the body than the first end portion of the diverter body. Each of the suspension supports can comprise a distal end portion spaced from the diverter body and a roller coupled to the distal end portion of the suspension support. A diverter frame can comprise a plurality of ramps, each ramp being associated with one of the rollers and comprising an upwardly inclined surface angled upwardly and away from the first end portion of the diverter body for rollingly receiving a respective associated one of the rollers. At least one actuator can be mounted to the frame and coupled to the diverter such that operation of the actuator moves the rollers upwardly along their respective associated ramp to thereby move the diverter body upwardly along the inclined ramps. The actuator in another mode of operation moves the rollers downwardly along the ramps. One or more catches can be pivotally mounted to the frame and positioned so as to pivot toward and away from an associated ramp. The catches can have a plurality of downwardly facing teeth that are shaped and positioned such that as a roller moves upwardly along the ramp associated with the at least one catch, the teeth can be coupled to the roller to prevent the roller from moving downwardly until such time as the catch is pivoted to a release portion away from the ramp.

As a further aspect of an embodiment, in a veneer handling apparatus, at least one veneer engaging diverter is supported for diverting veneer downwardly from a veneer flow path. The veneer engaging diverter can comprise an engager body portion having a central portion and first and second projecting end portions extending away from the central portion. The central portion can comprise a shaft mount for coupling the veneer engager body portion to a rotatable shaft. The first projecting end portion can comprise a first side edge that leads in the direction of rotation and a second side edge that lags in the direction of rotation upon rotation of the rotatable shaft in one direction. In addition, the second projecting portion can comprise a first side edge that leads in the direction of rotation and a second side edge that lags in the direction of rotation upon rotation of the rotatable shaft in said one direction. In addition, each of the second side edges can comprise a curved surface portion. In addition, the curved surface portion of each of the second such edges can comprise a convex surface portion. Also, the first side edges can each comprise a concave surface portion. In one specific form, the veneer engager can be S-shaped. In one form, the first and second projecting end portions can each comprise a distal end and the second side edges can each include a straight edge portion adjacent to the distal end. The diverter can have more than first and second of said projecting end portions, such as three or four of them.

As a further aspect of an embodiment, the veneer engager can be bifurcated through the central portion of the veneer engager body into first and second body sections. A portion of a first shaft receiving mount can be positioned on the first body section and a portion of a second shaft receiving mount can be positioned on the second body section. The first and second distal end portions can be acute. The veneer diverters can be provided in combination with a shaft with a plurality of said veneer engaging diverters coupled to the shaft, the diverters being aligned with one another along the shaft.

As another aspect of an embodiment, each of the projecting end portions can comprise a distal end portion configured to intersect a veneer flow path at an angle of between 75 degrees and 105 degrees, with a specific example being 90 degrees, when the distal end portion is rotated into the veneer flow path.

These and other features of embodiments will become more apparent from the description below and the drawings.

BRIEF DESCRIPTION OF THE DRAWINGS

FIGS. 4, 4A and 4B are respective front, side and top views of an exemplary spike that can be used in the embodiment of FIG. 1.

FIG. 5 is one form of a pinch belt assembly that can be used in the embodiment of FIG. 1.

FIG. 7 is an enlarged view of one form of diverters shown mounted to a support shaft.

FIG. 8 is an enlarged view of a single diverter of a type shown in FIG. 7.

FIG. 9 is a side elevational view of the diverter of FIG. 8.

DETAILED DESCRIPTION

Figure 1:
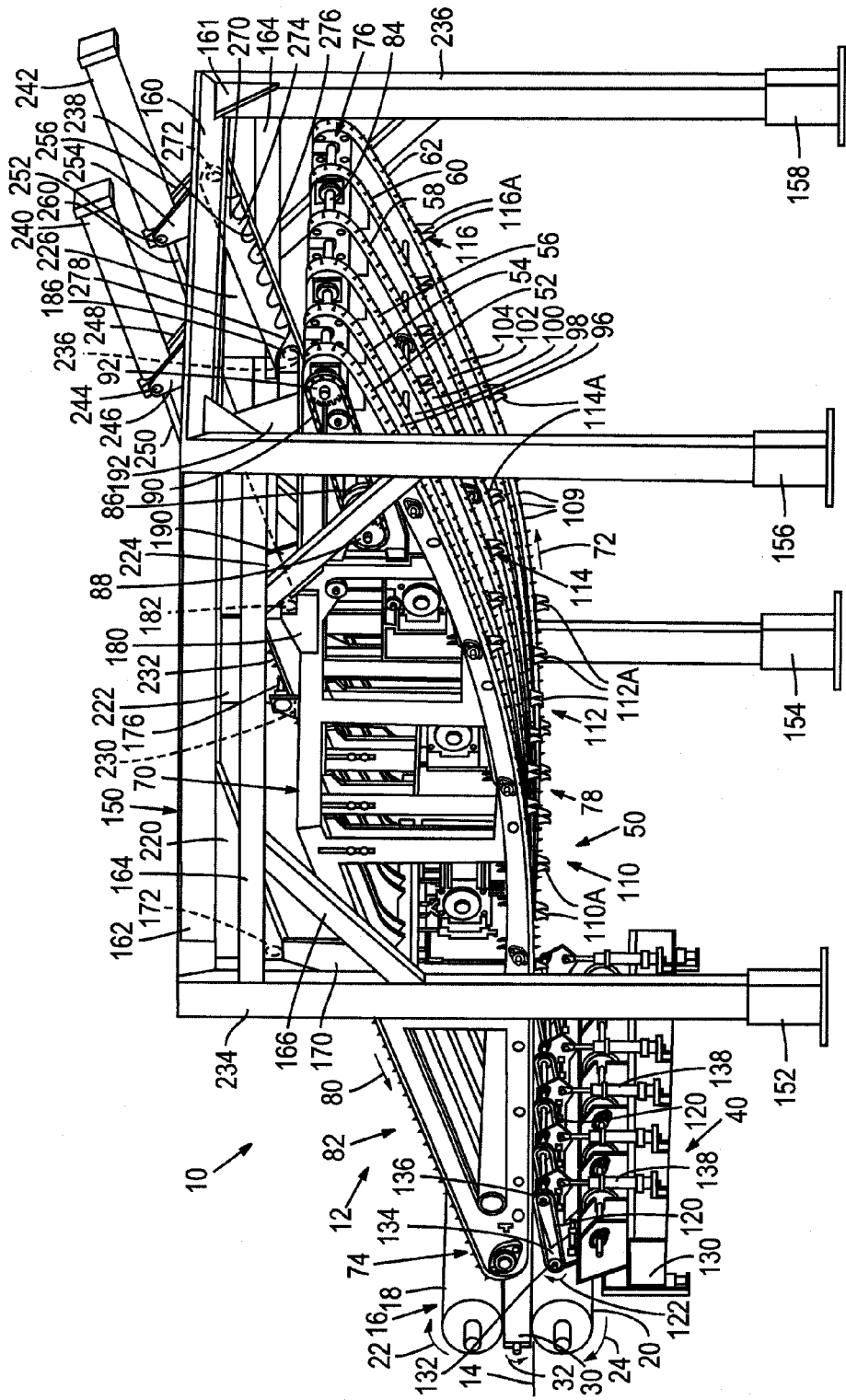
FIG. 1 is a perspective view of one embodiment of a wood handling system in accordance with this disclosure.
Figure 2:
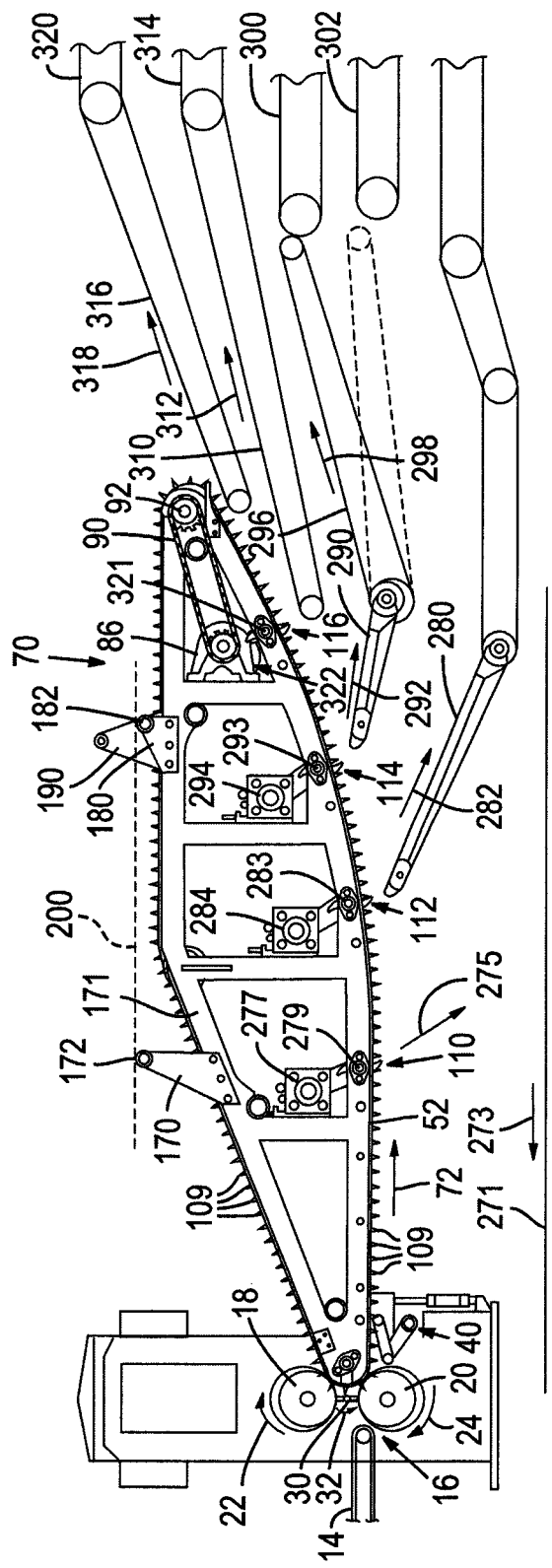
FIG. 2 is a side elevational view of an embodiment similar to the embodiment shown in FIG. 1, but without the frame and also illustrating an exemplary set of veneer transportation conveyors.
Figure 3:
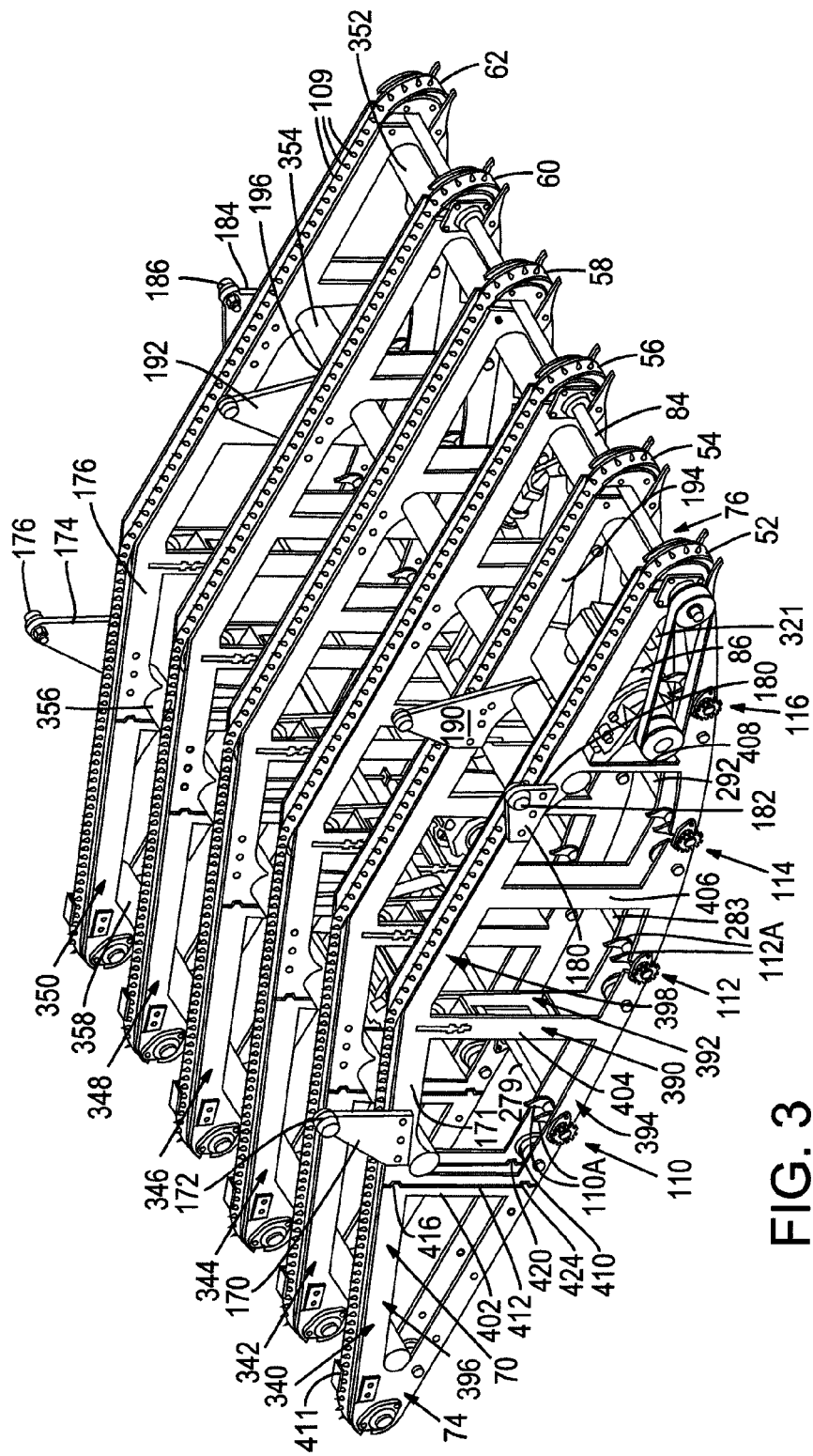
FIG. 3 is a perspective view of a diverter body portion of the diverter of FIG. 1.

With reference to FIGS. 1-3, one embodiment of a wood veneer handling system 10 is illustrated that comprises a veneer sorting diverter 12. In the embodiment of FIG. 1, which does not depict various conveyors typically included in a wood veneer handling system for convenience in illustration, a ribbon of veneer peeled from a log is carried by an end feed conveyor 14 to a clipper 16. Clipper 16 can comprise a conventional veneer clipper having upper and lower rolls 18, 20 supported for rotation in the respective directions indicated by arrows 22, 24. A clipper blade 30 is rotatably supported between the rolls 18, 20 for selective rotation in the direction of arrow 32 to clip the veneer ribbon in response to clipper control signals from a scanner controller not shown in FIG. 1. The clipper blade rotates from a horizontal to a vertical position to clip the veneer with the blade extending between the two rollers when in the clipped position. In the embodiment of FIG. 1, a pinch belt assembly 40 is illustrated for conveying the clipped veneer from the clipper to belts of a diverter assembly 50. The pinch belt assembly can be eliminated in some embodiments, such as in vacuum embodiments wherein a vacuum is used to hold veneer pieces in engagement against veneer transporting belts of the diverter assembly 50.

In the embodiment of FIG. 1, there are a plurality of transversely spaced apart endless loop belts 52, 54, 56, 58, 60 and 62 in this example, supported by a diverter assembly body 70 for travel in a veneer flow direction indicated by arrow 72 from an entrance end portion 74 of body 70 toward an exit end portion 76 of the diverter body. The belts travel in the direction of arrow 72 along a bottom portion 78 of the diverter body and in the opposite direction, indicated by arrow 80, along the top portion 82 of the diverter body. Various shafts and pulleys can be used to support the belts and maintain them in alignment as they travel. For example, a rotatable shaft 84 at end portion 76 of the body can carry a plurality of pulleys, not shown, for receiving the respective belts 52-62. The shaft 84 can be journaled by bearings to a portion of the framework of the diverter body. Although other veneer transporting belt drive mechanisms can be used, in one specific example, a motor 86 rotates a drive gear 88 coupled by a chain 90 or belt to a drive gear 92 mounted to the shaft 84. The motor 86 can be operated to drive the gears 88, 92 to in turn rotate the shaft 84 and move the belts 52-62 in the desired direction, such as in direction 72 along the bottom surface of the diverter assembly body 70. The term belts, in this disclosure, is to be broadly construed to include an elongated member that can, less desirably, be a chain. In the case of a vacuum system, the belts can have apertures to permit application of the vacuum through the belt to veneer pieces held against the belts by the vacuum.

As can be seen in FIG. 1, in this illustrative embodiment, gaps or spaces are provided between the respective belts 52-62. For example, a gap 96 is shown between belts 52 and 54, a gap 98 is shown between belts 54 and 56, a gap 100 is shown between belts 56 and 58, a gap 102 is shown between belts 58 and 60 and a gap 104 is shown between belts 60 and 62. Unlike a vacuum system, the belts shown in FIG. 1 comprise spike belts, each with a plurality of spikes spaced apart along the length of the belt and facing outwardly, with three such spikes 109 for belt 62 being numbered in FIG. 1. The spacing of these spikes can be varied with one specific example being about 2 inches apart. An exemplary belt spike is shown and described below in connection with FIGS. 4-4B.

At least one set of plural veneer engaging diverters is carried by the veneer diverter body 70. In FIG. 1, there are four of said sets of veneer engaging diverters indicated respectively by the numbers 110, 112, 114 and 116. In the FIG. 1 embodiment, the first set of veneer engaging diverters 110 comprises a plurality of transversely spaced apart veneer diverters, two of which are indicated by the number 110A. Also, the second set of veneer engaging diverters 112 comprises a plurality of transversely spaced apart veneer diverters, two of which are indicated by the number 112A. In addition, the third set of veneer engaging diverters comprises a plurality of transversely spaced apart veneer diverters, two of which are indicated by the number 114A. Also, the fourth set of veneer engaging diverters comprises a plurality of transversely spaced apart veneer diverters, two of which are indicated by the number 116A. Desirably the veneer diverters are positioned between the belts and are rotatable into the veneer flow path during operation of the veneer diverters as explained below to dislodge veneer impaled on spikes of the belts or held against the belts by a vacuum. One or more of the sets of veneer engaging diverters can comprise a plurality of diverters positioned in each of the gaps. For example, in the embodiment of FIG. 3, there are two veneer diverters 112A of set 112 positioned on either side of the belt 52 so that they can extend into the veneer flow path as the belt travels. As also can be seen in FIGS. 1 and 3, the veneer diverters of each set are desirably oriented in alignment with one another. As explained below, in response to control signals, the veneer diverters of the respective sets are moved into, stopped within, or moved out of the veneer flow path and are configured such that when stopped in the veneer flow path they divert veneer away from the belts. In the case of a vacuum system, any gap between veneer diverters can be closed by a baffle to minimize the possibility of the vacuum drawing the veneer back against the belts after being dislodged by the veneer diverters.

Figure 5A:
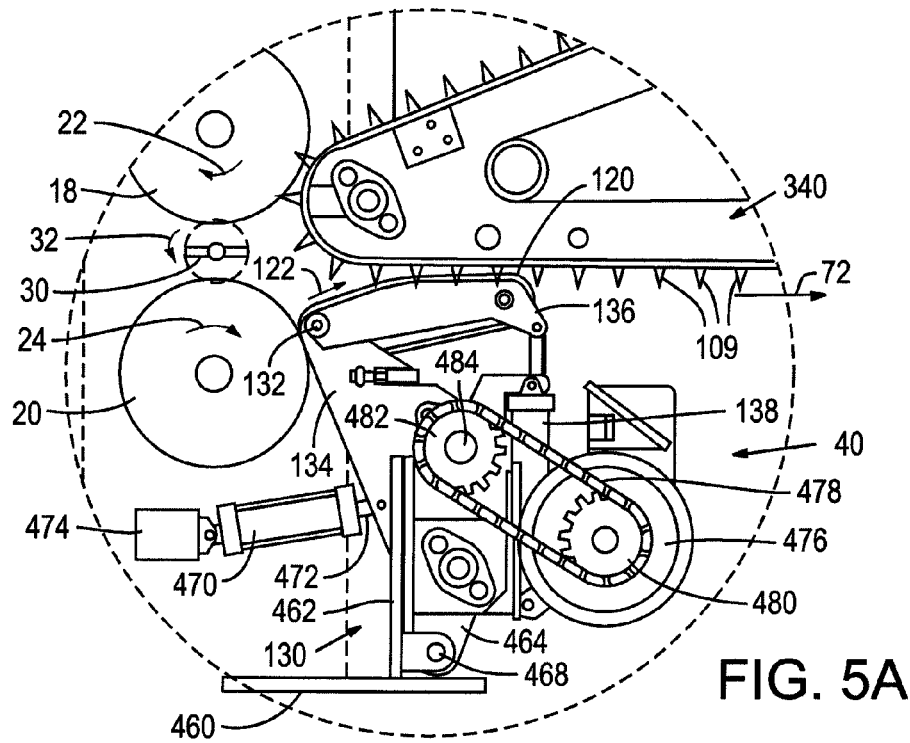
FIGS. 5A and 5B illustrate a form of pinch belt assembly that is movable from an operating position shown in FIG. 5A to a standby or maintenance or clearance position shown in FIG. 5B.

In the embodiment of FIG. 1, the pinch belt assembly 40 comprises six pinch belts, two of which are numbered by the numbers 120 in FIG. 1. The belts are driven by an actuator such as a motor (in the direction of arrow 122). Although not required, a single common motor can be used to move all of the pinch belts 120. The pinch belt assemblies can be pivoted at one end portion 132 (FIGS. 5, 5A) to a respective upwardly extending support portion 134 carried by the frame 130. This allows some upward and downward movement of the distal end portion 136 of the pinch belt assembly 120. A cylinder 138 coupled to a distal end portion of each pinch belt assembly 120 allows downward movement of the distal end portion to increase the gap between the belts of the pinch belt assembly and veneer transporting belts to, for example, permit the passage of debris or clumps of veneer material. In FIG. 5A, cylinder 138 is shown in its extended position that places the pinch belts 120 in position to urge veneer against the spikes 109 of the spike belt.

In the case of a diverter with spike belts as shown in FIG. 1, the pinch belt assemblies urge veneer traveling from the veneer clipper 16 against the spikes of the spike belt to impale veneer on the spikes. When veneer is peeled from a log, the lengthwise direction of the veneer corresponds substantially to the transverse direction of the veneer diverter. In addition, the spikes are desirably oriented to follow the grain of the veneer when the veneer is impaled. In the case of a vacuum system, the pinch belt assemblies can be eliminated as the vacuum draws the veneer pieces against the belt. However, in an alternative construction the pinch belt assemblies can still be utilized in a vacuum system. In an embodiment described below, the pinch belt assembly supporting structure 130 can be constructed so as to be pivotal about a transverse axis relative to an upright support to allow pivoting of the group of pinch belt assemblies away from the clipper to provide access to the clipper.

In the embodiment of FIG. 1, the diverter assembly body 70 is carried by a frame indicated generally by the number 150. The illustrated frame comprises four spaced apart posts 152, 154, 156 and 158. In the form shown, the posts 152, 154 are positioned at respective opposite sides of the diverter body 70 nearer to the front end 74 of the diverter body than the rear end 76. In addition, posts 156, 158 are positioned along opposite sides of the diverter body 70 near the rear end 76 of the diverter body. The diverter body can be positioned between the posts. Transversely extending cross members, one being indicated at 160 in FIG. 1, connect the upper ends of the respective posts 152, 154 and posts 156, 158. Gussets, such as 161, reinforce the interconnection between the upright post and transverse frame components. An upper longitudinally extending frame component 162 can extend between posts 152 and 156. A similar frame component can extend between the upper ends of posts 154, 158 on the opposite side of the frame. In addition, lower frame components 164 extend between the respective posts 152, 156 and posts 154, 158 at a location below the upper frame components 162. Reinforcing gusset pieces, such as one numbered as 166 in FIG. 1, can extend between the respective posts and lower cross members.

The diverter body assembly 70 can be supported from the frame in any suitable manner. In one desirable approach, as best seen with reference to FIGS. 2 and 3, a first support bracket 170 is mounted to an outer side surface of an upper diverter body frame member 171 and terminates in a distal end portion to which a roller 172 is mounted for rotation about a horizontal axis. A second upright support bracket 174 (FIG. 3) is mounted to an outer surface of a frame member 176 of the diverter body 70 at the opposite side of the diverter body from frame member 171. Bracket 174 terminates in a distal end portion to which a roller 176 is rotatably mounted for rotation about a horizontal axis. Desirably the rollers 172, 176 are directly opposed to one another. In addition, an upright bracket 180 is mounted to the member 171 and supports a roller 182 desirably rotatable about a transverse horizontal axis. A similar bracket 184 mounted to the member 176 carries a roller 186 desirably mounted for rotation about a transverse horizontal axis. Desirably the rollers 182, 186 are opposite to one another. The rollers 172, 176, 182 and 186 suspend the diverter body 70 from the frame as explained below. In addition, upright moving element coupling brackets 190, 192 project upwardly from respective frame components 194, 196 (FIG. 3) of the diverter body 170. The functioning of these brackets will become apparent from the description below. As can be seen in FIG. 2, desirably the rollers 172, 182 are positioned in a horizontal plane 200 when the diverter body is installed on the frame as shown in FIG. 1. Similarly, the rollers 176, 186 are in the same plane 200.

With reference to FIG. 1, the frame comprises first and second rear ramp defining members 220, 222 and first and second front ramp defining members 224, 226. The members 220, 222 can be identical. In addition, the members 224, 226 can also be identical. Consequently, only members 222 and 226 will be described. Support 222 comprises an inwardly directed shelf that can be in the form of a roller receiving channel that, in the embodiment of FIG. 1, comprises a first support portion 230 that can be horizontal and an inclined portion 232 that extends both inwardly and upwardly moving from the entrance end portion of the frame 234 to the exit end portion of the frame 236. The roller 176 is shown resting on the shelf portion 230 when the diverter body is supported in its operational position. A stop can be included at the entrance end portion of the shelf portion 230 to prevent the roller from rolling off of the shelf. In addition, support portion 226 comprises first shelf portion 236 that can be horizontal, and can be provided with a stop at the entrance end portion of the shelf and a ramp portion 238 inclined upwardly moving toward the exit end portion 236 of the frame. In response to force applied to the diverter body 170, such as generally upwardly in a direction toward the exit portion 236 of the frame, the rollers 182, 186 travel upwardly along their respective ramps (e.g., roller 236 travels upwardly along ramp 238) and the rollers 176, 186 and 172, 182 travel upwardly along their respective ramps (e.g., roller 176 travels upwardly along ramp 232). As a result, the diverter body is moved upwardly and away from the clipper 16. With this construction, the diverter body can be positioned very close to the clipper 16 as it can be moved out of the way when access to the clipper is desired. Although different actuator mechanisms can be utilized to apply force to the diverter body to move the diverter body as just described, such as motors or other movement mechanisms, in the embodiment of FIG. 1, respective first and second cylinders 240, 242, which can be fluid cylinders such as hydraulic or pneumatic cylinders, are supported by the frame and coupled to the diverter body. More specifically, the cylinder housing of cylinder 240 can be pivoted at pivot 244 to upright brackets 246, 248 to support cylinder 240. A cylinder rod 250 of cylinder 240 in this example is pivotally connected to the upwardly projecting bracket 190 (FIG. 3). In the same manner, the cylinder housing of cylinder 242 can be pivoted at 252 to respective brackets 254, 256 extending upwardly from the frame. The cylinder rod 260 of cylinder 242 can be connected to the support 192 (FIG. 3). Retraction of the rods 250, 260 moves the rollers 172, 182 and 176, 186 up their respective ramps to move the diverter body as previously described.

As a safety mechanism, one or more engagable stops can be provided to engage the diverter body to prevent it from moving back down the ramp at undesired times. One such stop mechanism can be associated with each of the supports 224, 226. The stop mechanisms can be the same and therefore only the mechanism associated with support 226 is described in connection with FIG. 1. The illustrated stop mechanism comprises an elongated body 270 pivoted at an end portion 272, spaced from roller 248, to the support 226 or to the frame. The body 270 can comprise a plurality of downwardly extending teeth, one of which is numbered as 274 in FIG. 1. A respective roller receiving recess 276 can be provided between each of the teeth. The walls bounding the recess are shown angled with the lower wall being generally perpendicular to the shelf and the upper wall being angled at an acute angle relative to the shelf. In addition, an angled ramp surface 278 is provided at the lower end of the body 270. As the diverter body is moved upwardly, roller 186 engages ramp 278 and pivots the stop body 270 upwardly away from the shelf. As a roller enters the first recess, the roller (or a pin thereof) is retained against downward movement (for example, if the cylinders 240, 242 were to fail) by the lower boundary of the recess. Continued movement of the diverter body 170 upwardly again raises the stop body 270 allowing the roller pin to move into the next recess and so on until the diverter body has been moved to its fully raised position. In order to allow lowering of the diverter body, the stop can be pivoted upwardly away from the shelf so that the roller and/or roller pin clears the teeth and the diverter body can be moved downwardly by the cylinders 240, 242.

With reference to FIG. 2, components of FIG. 2 that correspond to those of FIG. 1 have been assigned the same numbers as used in FIG. 1 and will not be discussed in detail. As can be seen in FIG. 2, the lower surface of the illustrated diverter body is arcuate and more specifically convex such that the veneer flow path 72 of veneer impaled on the spikes 110 (or held by a vacuum against the veneer transporting belts) also follows the arcuate path unless diverted by a respective set of diverters.

In the embodiment of FIG. 2, a first conveyor 271 is shown with the upper portion of the conveyor being movable in the direction indicated by arrow 273 when the conveyor is driven. Conveyor 271 is typically a haulback or trash conveyor positioned to convey trash veneer to a hog or shredder for shredding the veneer into chips. Assuming that a scanner indicates that trash veneer has been clipped (e.g., a section of veneer containing a big knot is clipped from a veneer ribbon by clipper 16 and impaled on spikes 110 by the pinch belt assembly 40), the trash veneer will be moved in the direction of arrow 72 toward the first set of diverters 110. The first set of diverters can be operated to divert trash veneer being moved by the diverter belts. More specifically, by moving the diverters of the first set into the veneer flow path, as the veneer reaches the first set of diverters that are stopped in the veneer flow path, the trash veneer engages the diverters and is directed, such as generally indicated by the arrow 273 away from the belts and toward the trash conveyor 271. A motor 277 coupled to a diverter supporting shaft 279 in this embodiment rotates the shaft and thus the diverters mounted thereto, about a transverse axis positioned above the veneer flow path. The diverters are moved desirably in the veneer flow path direction (e.g., they are rotated counter clockwise in FIG. 2) such that the lower projecting portion of the diverters enter the veneer flow path at an upstream direction, travel in a downstream direction and leave the veneer flow path. By stopping the diverter in the flow path, the diverter is in a position to engage the veneer and direct it downwardly and away from the belts. Desirably, the set of diverters 110 remain in their veneer diversion position until such time as another grade of veneer is indicated by a scanner as reaching or about to reach the first set of diverters. In this case the first set of diverters is pivoted out of the veneer flow path to allow the higher grade veneer to pass the first set of diverters.

Assuming that the second set of diverters 112 are controlled to divert fishtail veneer from the veneer flow path (this is simply an illustrative example as other grades of veneer could be diverted by the set of diverters 112). Also assume that a piece of fishtail veneer is about to reach the set of diverters 112. Again, if the set of diverters 110 are operated to divert trash veneer, the diverters 110 would have been moved out of the way to permit the fishtail veneer to pass. Under these conditions, the diverters 112 are moved, desirably in the veneer flow direction, into the veneer flow path, or remain in the veneer flow path if already there. As a result, when the fishtail veneer encounters the diverters 112, the fishtail veneer is diverted onto a conveyor 280 in a direction generally indicated by the arrow 282. The conveyor 280 carries the fishtail veneer to a fishtail veneer collection location and/or to additional conveyors where the fishtail veneer can be manually pulled or further sorted. The diverters of set 112 can be mounted to a shaft 283 for rotating about a second diverter shaft axis positioned above the veneer flow path. A motor 284 can rotate the shaft 283 to selectively position the veneer diverters of set 112 in the veneer flow path as desired. Motors 276 and 284 are responsive to motor control signals as explained below, as is the case for the other veneer diverter set controlling motors.

Assume that veneer diverter set 114 is operable to divert random grade veneer from the belt. In this case, as the random grade veneer reaches the first and second sets of diverters 110, 112, these diverters are moved out of the veneer flow path to allow the random grade veneer to pass. As the random grade veneer reaches the diverter set 114, the veneer diverters of this set are moved into the veneer flow path, or remain in the veneer flow path if already there, and are stopped in a position to divert the random grade veneer downwardly away from the veneer transporting belts and onto a conveyor 290 with the veneer generally traveling in the direction of arrow 292 on an initial portion of the conveyor. The veneer diverters of a set 114 can be mounted to a shaft 292 extending transversely relative to the veneer diverter body, as can be the case of shafts 279, 283, with the shaft 292 being driven by a motor 294 in response to a motor control signal. The conveyor 290 can, for example, be coupled to a respective movable conveyor 296.

The conveyor 296 can be movable from a first position shown in solid lines in FIG. 2 and a second position shown in dashed lines in FIG. 2. When in the solid line position, the veneer travels from conveyor section 290 to conveyor section 292 and in the direction of arrow 298 to a conveyor section 300 from where the veneer is transported to a desired sorting or stacking location. When conveyor section 296 is in the dashed position shown in FIG. 2, the veneer is carried to a conveyor 302 for transporting the veneer to a different location. For example, wider sized random grade veneer can be transported to conveyor 300 and narrower random veneer can be transported to conveyor 302.

In an exemplary three diverter set system, and assuming diverter set 110 is operable to divert trash veneer, diverter set 112 is operable to divert fishtail veneer, and diverter set 114 is operable to divert random veneer, in the event full sized veneer is detected and reaches any one of the veneer diverter sets 110, 112 and 114, the diverters of these sets are moved out of the veneer flow path to permit passage of the full sized veneer. The full sized veneer can be directed to a conveyor for carrying the veneer to a stacking or sorting location.

As another example such as shown in FIG. 2, a fourth set of diverters 116 can be provided that can (assuming the sets 110, 112 and 114 divert respective trash, fishtail and random veneer) further sort the full sized veneer. For example, assume that diverter set 116 is operable to divert extremely wet veneer, such as sapwood veneer with the moisture content being detected, for example using a moisture detector not shown. In this example, the veneer diverter set can be operated as follows. As a full sized wet sapwood veneer sheet travels along the belts, the diverter sets 110, 112 and 114 are moved out of the way to permit passage of the veneer. However, when the veneer reaches the diverters of diverter set 116, the diverter set 116 diverters are positioned in the veneer flow path, or remain in the veneer flow path if already there, to divert the full sized wet sapwood veneer sheets to a conveyor 310 for travel in the direction of arrow 312 to a conveyor 314 for transportation to a stacking or further sorting area. If the full sized sheet is not a wet sheet, assuming the veneer diverters of set 116 are operable to divert wet veneer sheets downwardly and away from the belt, when the sheet reaches diverters 116, the diverters are moved out of the way if not already out of the way. This allows the full sized dry sheet to be transported to a conveyor 316 for travel in a direction of arrow 318 to a conveyer 320 for transportation to a stacker or other sorting location. The various conveyors can be replaced with other veneer handling devices such as stackers if desired. The veneer diverters of set 116 can be mounted to a transverse shaft 321 rotatably coupled to the veneer diverter body 70 and driven in rotation by a motor 322 in response to motor control signals. Since sapwood is located on the outer layers of a log, assuming the diverters of set 116 are operable to divert full sheets of sapwood veneer from the veneer flow path, once sapwood is detected the veneer diverters of set 116 can be maintained in their diversion position continuously until such time as heart wood or drier wood is detected. Once drier wood is detected, the remaining wood peeled from the log should also be dry. Therefore, the diverters of set 116 can be moved out of the diverter flow path once relatively dry wood peeled from the log reaches the position of diverters 116 until the next time a new log is positioned for peeling.

With reference to FIG. 3, the belts 52-62 are shown being driven by motor 86 coupled by pulleys and a belt to the shaft 84. This is simply another example of a suitable drive mechanism for the diverter belts.

The diverter body illustrated in FIG. 3 can comprise a plurality of generally triangular truss-like structures with an arcuate base. Since these structures can be the same, only one of these structures is described below. In the embodiment of FIG. 3, there are six truss structures 340, 342, 344, 346, 348 and 350 interconnected by a plurality of transversely extending cross members, such as four such tubular members 352, 354, 356 and 358. Since the truss structures of the diverter body 70 can be the same, only structure 340 will be described. The illustrated structure 340 comprises first and second side wall portions 390, 392 that can be interconnected by reinforcing spacers. Since these side members can be mirror images of one another, only side member 390 will be described in detail. The member 390 comprises a lower arcuate cord portion or base portion 394 and first and second upper sections 396, 398. Upper section 396 joins the end of the base portion 394 adjacent to end 74 of the truss structure. Portion 398 joins the end of the base 394 adjacent to end 76 of the diverter body. The sections 396, 398 meet at a location 400 intermediate to the ends 74, 76 of the diverter body 70. Spaced apart upright frame portions 402, 404, 406 and 408 extend between the base portion 394 and the sections 396, 398. Upright frame portion 408 is narrower than the corresponding uprights of the other truss sections to provide clearance for a diverter belt drive mechanism. Belt guide pulleys, one being indicated at 410 in FIG. 3, are rotatably supported between the inner and outer side sections 390, 392 for guiding the associated transporter belt as it moves. The peripheral edges of the upper and base sections of the respective inner and outer support members 390, 392 can extend upwardly along the sides of the diverter belt to guide the movement of the diverter belt. A belt retainer, such as one being numbered as 411 in FIG. 3, can be provided in association with each truss structure to assist in retaining the belt on its associated belt supporting structure. In addition, to facilitate transportation of the diverter body, the sections 394, 396 and upright 402 can be split along a seam interface 412. Mating features, such as interfitting projections and recesses 414, 416 in the respective base section 394 and upper section 396 can be provided for purposes of aligning the diverter body sections when assembled and to provide a stronger connection of the assembly. These components can be bolted together when the structure is assembled, or otherwise interconnected, for example, by welding.

FIGS. 4, 4A and 4B illustrate an exemplary spike that can be installed on a belt such as belt 52. As shown in FIG. 4, the illustrated spike comprises a base 420 that can comprise a friction enhanced upper surface 422, such as a knurled surface as shown by knurls 424 in FIG. 4B. The illustrated belt spike comprises a central shank portion 426 that can be threaded. The shank portion 426 can be inserted through an opening provided in the belt 52. In addition, a nut 428 (which can include a lock washer not shown) can detachably secure the spike to the belt. With reference to FIG. 4A, one exemplary form of spike can comprise an impaling portion 430 projecting upwardly from the shank portion 426 with a tip 432. With reference to FIG. 4, the spike can comprise an upper veneer penetrating portion 434 that can comprise a rounded tip 432 with the upper portion 434 comprising converging surfaces 436, 438 that converge moving upwardly toward the tip 432. The surfaces 436, 438 can converge inwardly toward one another moving in a direction away from the tip (at a location 440). The spike of this example, thus, in effect forms a veneer retaining recess or barb at this location. Surfaces 436, 438 then diverge moving from the location 440 downwardly toward the threaded shank 426 to a location 452 intermediate the location 440 and the upper surface 454 of the shank 426. The enlarged cross sectional area at location 452 helps to resist further penetration of the spike into the veneer.

When mounted to the 52, desirably the spike is oriented such that the width of the tip is substantially parallel to the grain and perpendicular to the veneer flow direction 72. Consequently, when veneer is impaled on the spikes, the spikes tend to separate fibers of the veneer without significantly cutting these fibers.

Although variable in dimension, an exemplary length of the spike from shank surface 454 to the tip 432 is 0.94 inches.

FIG. 5 illustrates an exemplary form of pinch belt assembly 40 with components in the embodiment of FIG. 5 being assigned in the same numbers as the components of FIG. 1. Since these components have been previously discussed, they will not be discussed further in connection with FIG. 5.

Figure 5B:
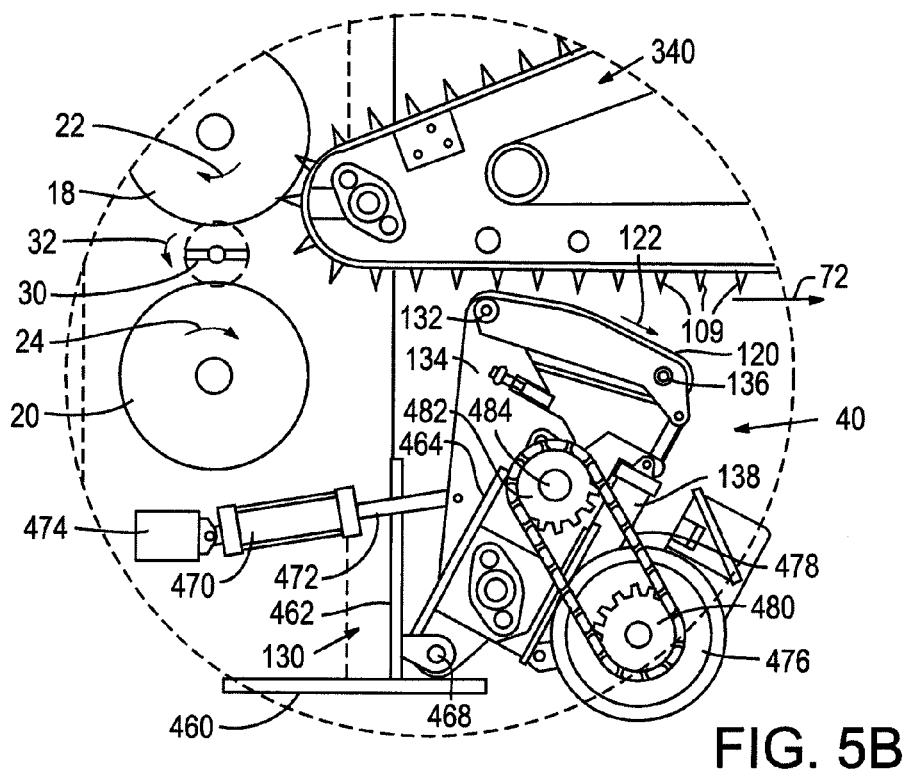

FIGS. 5A and 5B illustrate a further embodiment of a pinch belt assembly. Again, components in common with the components of the pinch belt assembly of FIG. 1 and of FIG. 5 have been assigned the same numbers and will not be discussed in detail. In the embodiment of FIGS. 5A and 5B, the support 130 comprises a base support portion 460 with an upright wall section 462. The pinch belt assembly is carried by a pinch belt assembly support 464 pivoted to the wall section 462 by a pivot pin 468. In FIG. 5A, the pinch belt assembly can be pivoted from a first or operating position shown in FIG. 5A wherein the pinch belt 120 (as well as the pinch belts of all of the pinch belt assemblies) are shown positioned by cylinders 138 in position to urge veneer against the spikes 109. If cylinders 138 are retracted, a greater gap exists between the pinch belt 120 (and the other pinch belts) and the spikes 109. When in this position material that may have jammed (e.g., multiple layers of veneer reaching the pinch belts assemblies simultaneously) will be cleared by the belt traveling in the direction of arrow 72 with the veneer being dropped onto the trash conveyor 270 (FIG. 2) as it will not be impaled by the spikes. The pinch belt assembly of FIG. 5A can be pivoted about the axis of pivot pin 468 from an operating position shown in FIG. 5A to a clipper maintenance or clearance position shown in FIG. 5B to provide greater access to the clipper. Any suitable mechanism can be used for pivoting the pinch belt assembly between the positions shown in FIGS. 5A and 5B. For example, a hydraulic or pneumatic cylinder 470 (a fluid cylinder) can have a rod portion 472 pivoted to the upright pinch belt support 134 and a cylinder housing pivoted to supporting framework, such as framework of the clipper as indicated schematically by component 474. Extension of the cylinder pivots the pinch belt assemblies from the position shown in FIG. 5A to the position shown in FIG. 5B, and vice versa. In FIGS. 5A and 5B, a pinch belt drive motor 476 is shown coupled by a chain 478 and respective drive gears 480, 482 to a pinch belt drive shaft 484 coupled to the respective pinch belts 120 for causing the pinch belts to travel in the direction of arrow 122.

Figure 6:
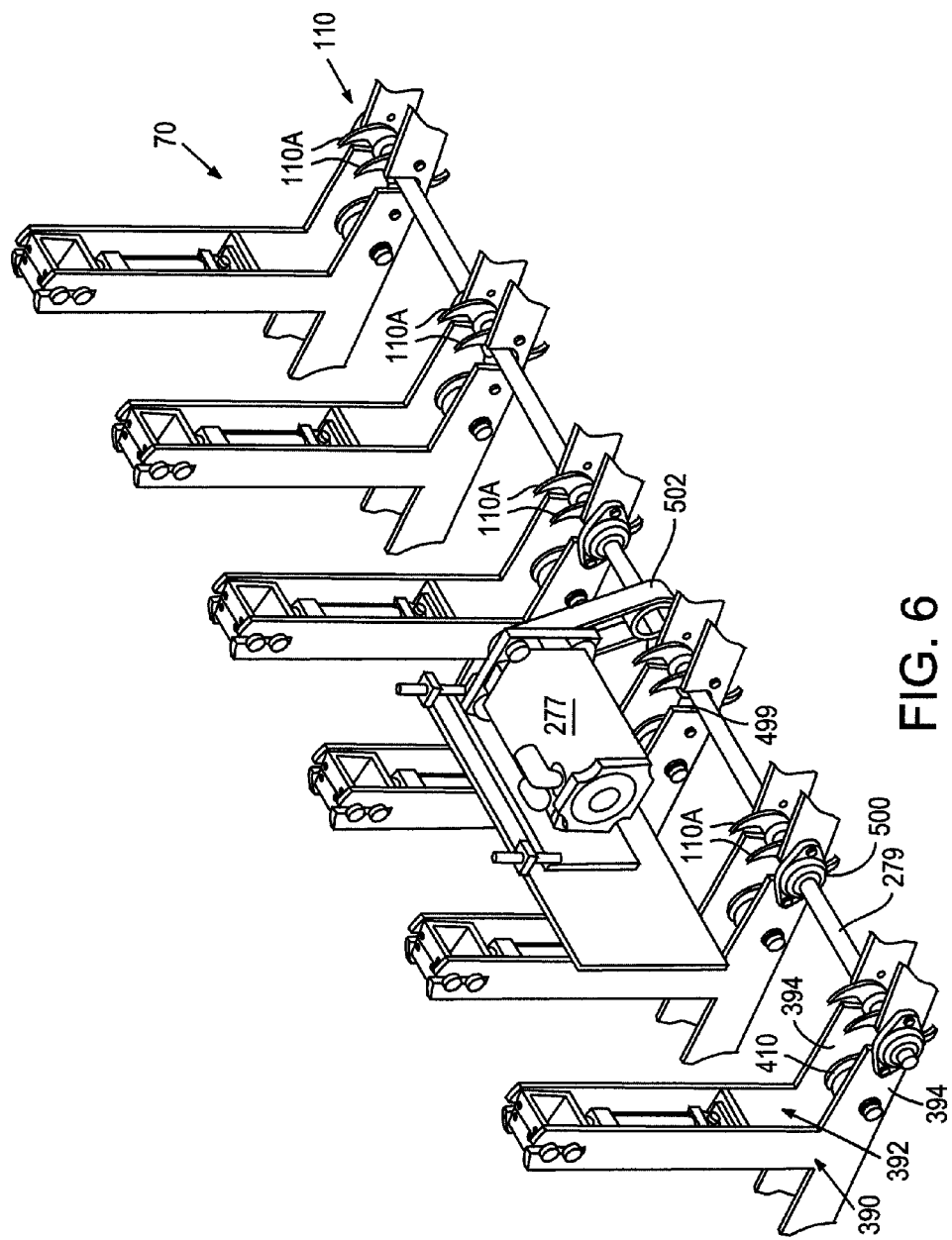
FIG. 6 is an enlarged view of a portion of the diverter body of FIG. 3 showing one set of plural diverters mounted to a support shaft and also illustrating a motor for rotating the support shaft.

With reference to FIG. 6, a portion of the diverter body 70 is shown with the set of veneer engaging diverters 110 shown mounted to a diverter drive shaft 279. The shaft 279 is coupled to base portion 394 of the diverter body structure 70 by bearings, such as one such bearing numbered as number 500 in FIG. 6. Components in FIG. 6 like those in figures previously discussed have been assigned the same numbers for convenience. Belt guiding pulleys (such as one numbered 410) are also shown in FIG. 6. In addition, in the structure shown in this figure, pairs of spaced apart veneer diverters 110A are positioned between adjacent base components 394 with a gap provided therebetween within which an associated diverter belt can travel between the veneer diverters 110A. In FIG. 6, the drive motor 277 can, for example, be a stepper motor and can provide feedback to a drive motor controller. The motor 277 is shown coupled by a timing belt 502 to the shaft 279 for driving the shaft in rotation. Other mechanisms can be utilized to track the location of the diverters 110A, such as position sensors.

FIG. 7 illustrates a shaft 279 and a set of diverters 110 removed from the supporting structure shown in FIG. 6. As can be seen in FIG. 6, the shaft 279 can be received in slots that face upwardly in base 394 (one being numbered as 499 in FIG. 6) to permit removal of the shaft and diverters following disconnection of the bearings 500 from the base members 394. Referring again to FIG. 7, in use, the shaft 279 can be rotated in the direction of arrow 502.

Although other forms of diverters can be used, a particularly advantageous form of diverter is illustrated in FIGS. 8 and 9. For convenience, the veneer diverter in FIGS. 8 and 9 is labeled as 110A. It should be understood that, in the embodiment of FIGS. 8 and 9, adjacent pairs of diverters that straddle a belt can be mirror images of one another and thus the veneer diverter of FIG. 8 is a left hand diverter of the pairs shown in FIG. 7. The illustrated veneer diverters 110A in FIGS. 8 and 9 comprise a body portion 510. A shaft mount 512 is included in the body portion with an opening 514 therethrough (and extending through a central portion of diverter body 510 for receiving the support shaft, such as shaft 279 in FIG. 7. In one desirable form, the veneer diverter 110A is formed of a plurality of sections, in this example first and second sections 516, 518. A first portion 520 of mount 512 is positioned at the proximal end portion (near the center of the assembled veneer diverter 110A) of section 516. Another portion 522 of the mount 512 is positioned at the proximal end portion of diverter section 518. The mount sections 520, 522 each define a semicircular opening in this example so that, when the mount sections are secured together, for example by fasteners not shown extending through openings along the sides of the mount sections (e.g., see aligned openings 524, 526 in FIG. 9 with similar openings being provided at the opposite side of the mount sections). When fasteners are inserted into these openings (for example, threaded bolts) and tightened, the mount sections 520, 522 clamp the veneer diverter to the supporting shaft. Desirably veneer diverters and the supporting shaft are made of a durable material such as steel, although a lighter weight durable material can be used (for example, the shaft can be made of aluminum). With this construction, the veneer diverters can readily be detached from their associated shaft for replacement, for example if they become damaged.

Each of the veneer diverter sections 516, 518 comprises a respective distal end portion 530, 532 spaced from the proximal end portion mounted to the shaft. When rotated in the direction of arrow 502, the diverter sections 516, 518 each include respective first side edge portions 534, 535 that lead in the direction of rotation 502. In addition, each of the diverter sections 516, 518 comprises another or second side edge surface 536, 538 that lag in the direction of rotation. As explained below, the surfaces 536, 538 comprise veneer engaging surfaces that engage the veneer when the diverter 110A is in the lowered position (that is the respective surface 536 or 538 that is positioned in the veneer flow path) to divert the veneer away from the belts and out of the veneer flow path. By providing two of the veneer diverter sections 516, 518 per diverter, the shaft 279 need only be at most rotated 180 degrees to position another veneer diverter side edge 536 or 538 in position to divert veneer. Less desirably, a diverter can be provided with only a single diverter section, although this would mean that the diverter section may have to be rotated through 360 degrees from the time it enters the veneer flow path to the time the diverter again enters the veneer flow path when rotated in the direction 502.

Since each of the surfaces 534, 535 can be the same in this embodiment and each of the surfaces 536, 538 are the same in this embodiment, only the surfaces 534 and 536 will be described in detail. Thus, the illustrated veneer engaging surface 536 in one form comprises a veneer engaging surface that does not lie entirely in a single plane. In one form, the surface 536 can have at least a portion that is arcuate or curved in shape. In one form, the veneer engaging surface 538 can comprise a convex portion that is positioned to engage veneer traveling in a veneer flow path direction when the projecting portion of the diverter 110A is stopped in the veneer flow path. The surface 534 opposite to the veneer engaging surface 536 can comprise a concave portion.

Looking at the overall diverter 110A, in the form shown in FIGS. 7 and 8, the diverter can have a generally S-shaped diverter body shape with first and second diverter projections comprising the respective sections 516, 518 or those portions of these sections that extend into the veneer flow path. The width and dimensions of the S-shaped diverter body can be varied. In addition, the projecting portions of the sections 516, 518 extending away from a mounting shaft (for example, shaft 279) can comprise respective first and second cusp (or half crescent shaped) projections.

As explained below, when mounted to a diverter supporting shaft, such as shaft 279, in one form the diverter projections can be shaped and configured such that the angle of entry between the veneer engaging surface at the distal end portion of each diverter projection and the veneer flow path is between 75 degrees and 105 degrees when the distal end portion rotates into the veneer flow path. The steep angle of entry facilitates the positioning of a diverter projection between closely spaced veneer pieces. In one specific desirable example, the angle of entry is approximately 90 degrees. By having a steep angle of entry and rotating the diverter in the direction of veneer flow, extremely fast veneer processing can be achieved. For example, the embodiment of FIG. 1, using spike belts and diverters as shown in FIGS. 8 and 9, have been successfully operated at speeds of veneer travel (diverter belt speeds) of 435 feet per minute.

With reference to FIG. 9, the veneer engaging surface 536 can comprise a straight portion 560 adjacent to the distal end 530 and a curved portion 536 extending from the straight portion, in this example, to a location adjacent to or at the proximal end of the section 516. Also, the sides 534, 536 converge toward one another moving toward the distal end 530. This configuration of the distal end facilitates entry of the distal end into the veneer flow path.

The dimensions of the diverter 110A can be varied. However, in one specific example, the height y measured from a line intersecting the center 564 of the diverter 110A and a line intersecting the straight edge 560 is 2.62 inches. In addition, the distance x from the center 564 of the diverter along a line intersecting the plane of edge 560 to the distal end 530 is 3.09 inches. These are exemplary dimensions for one specific example of a diverter and can be varied.

Figure 10:
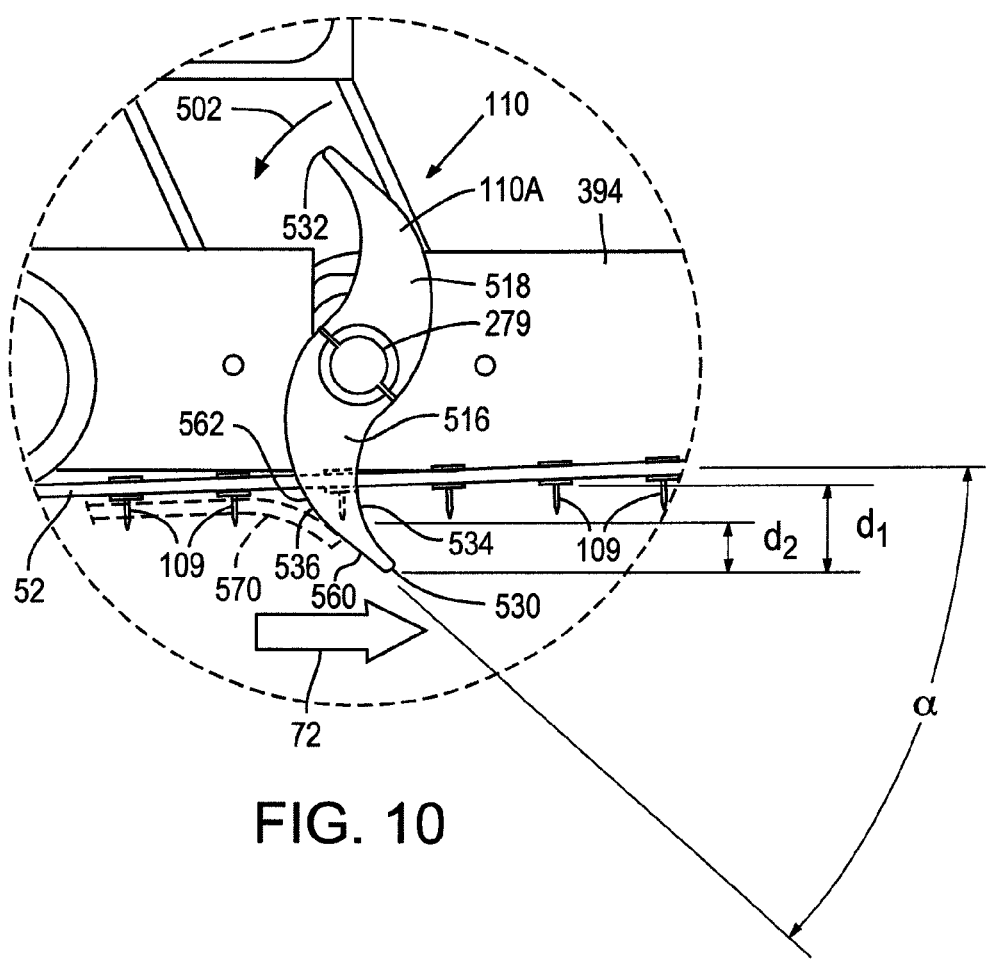
FIG. 10 is an enlarged view illustrating a diverter positioned in the veneer flow path.

FIG. 10 illustrates one of the veneer diverters 110A (which is a mirror image of the diverter shown in FIGS. 8 and 9) in position to divert a piece of veneer 570 impaled by spikes 109 downwardly and away from the belt 52. As the piece of veneer 570 approaches the location of diverter 110A, the diverter is moved in the direction of arrow 502 (by rotating the shaft 279) into the veneer flow path and stopped in the veneer flow path, as shown in FIG. 10. If, however, the diverter 110 is already positioned as shown in FIG. 10, the projecting portion of diverter section 516 simply remains in position for diverting veneer. As the belt carries the veneer in the direction of arrow 72, the leading edge of the veneer engages the veneer diverting surface 562 and is directed downwardly along surface 560 and away from the belt 52. In this example, the angle between surface 560 and the belt 52 is indicated as a. Desirably a is about 45 degrees, although it can be established to be within a range of angles, with 42 degrees being one specific example. In the position shown, the distal end 530 is positioned below the undersurface of the veneer that is being held by the belt. For example, a distance D1 from the undersurface of the belt at the location of the diverter 110 to the distal end of the diverter can be, for example, 1⅝ inches. In addition, the distance D2 from the end of a spike 109 at the location of the diverter 110 to the distal end 530 can be 1 inch. These dimensions are exemplary and can be varied. It is desirable, however, to have a portion of the diverter extending below the level of the veneer to direct the veneer in the desired direction as it is disengaged from the belt.

Figure 11:
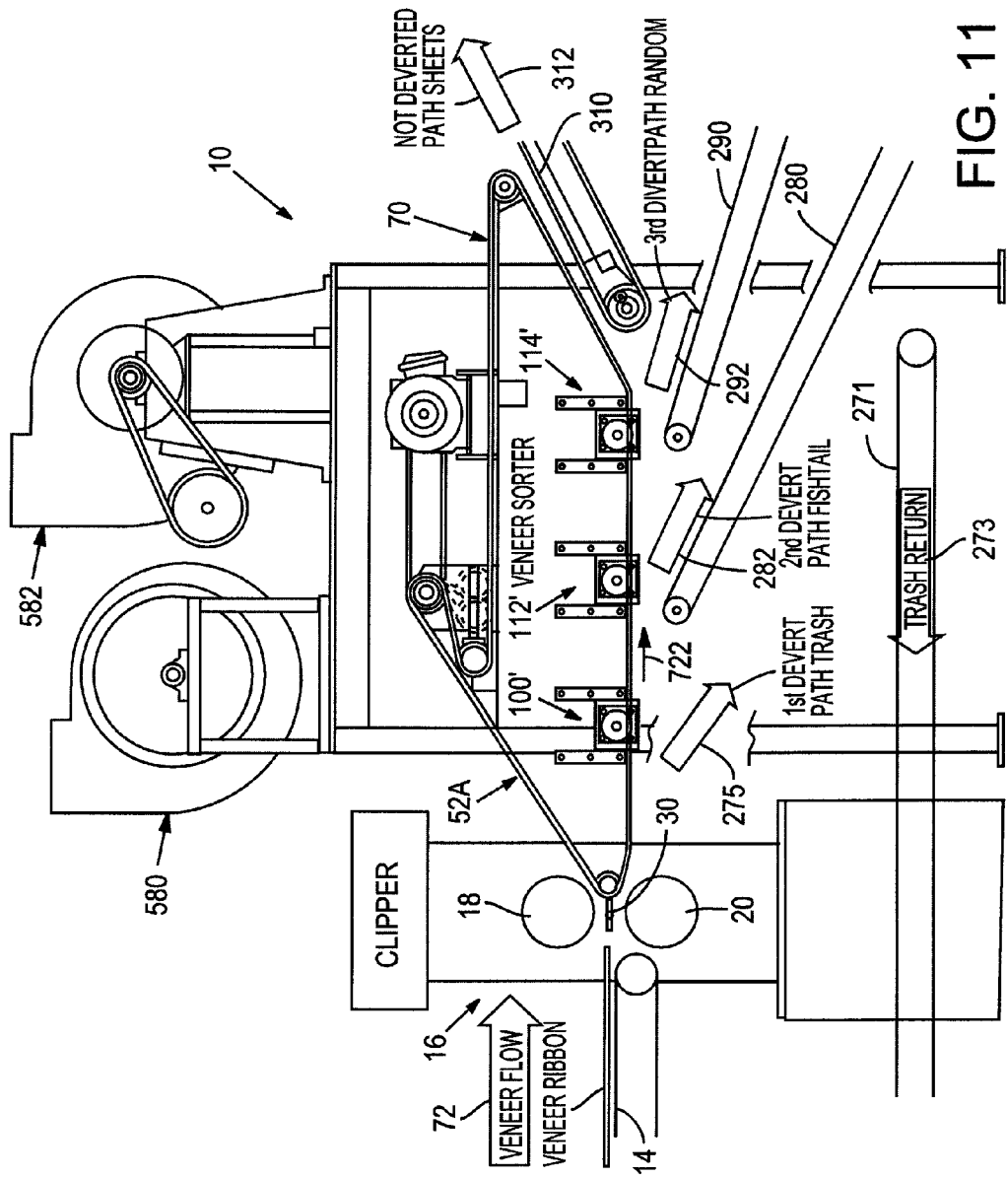
FIG. 11 is a side elevational schematic view of an alternative form of wood veneer handling system in accordance with this disclosure utilizing a vacuum to hold pieces of veneer in engagement with belts.

FIG. 11 illustrates an alternative form of wood veneer handling system in which the veneer is engaged to the belt using a vacuum instead of spikes. For convenience, the same numbers have been used in FIG. 11 for components in FIG. 11 that are in common with those of FIG. 1, with these components not being discussed further. The sets of veneer diverters 110', 112', 114' can be the same form of diverters as shown in FIG. 1 and in FIGS. 7-9. Alternatively, the diverters of the diverter sets can be of a different form, such as shown in FIGS. 13A-13G and explained below. The diverter body 70 can be as shown in FIG. 11. Alternatively, the diverter body can be of the form discussed previously in connection with FIGS. 1-3; or another suitable form. Also, the conveyor system of FIG. 11 can be like that shown in FIG. 2 above. However, in the FIG. 11 form of diverter system, only three sets of diverters are shown with only a single path and conveyor 310 for undiverted sheets, such as full sheets of veneer. In a vacuum system, desirably baffles are positioned above the veneer diverters of the diverter sets 110', 112' and 114' (the ' designation indicating that different configurations of diverters can be used in the sets) to shield the diverters from the vacuum being drawn by vacuum blowers 580, 582 being used to apply a vacuum to draw the veneer toward the belts. These baffles prevent the diverted veneer from immediately being drawn back toward the belt prior to reaching the appropriate conveyor.

Figure 12A:
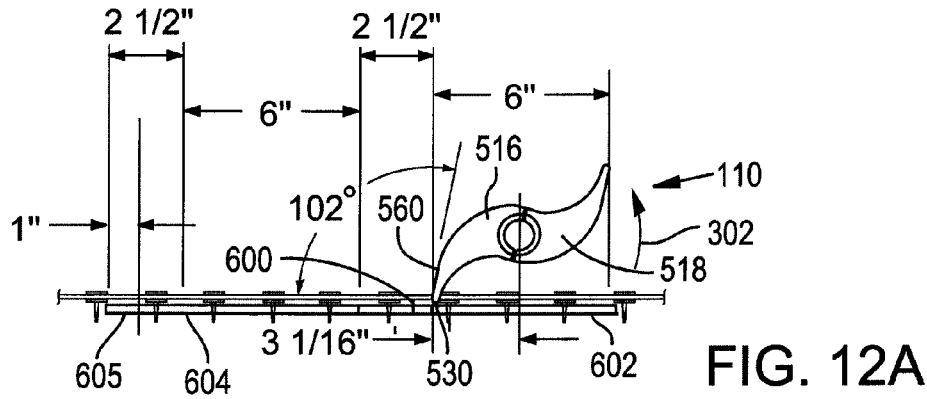
FIGS. 12A-12I illustrate the operation of one diverter as it is shifted into a position in a veneer flow path and stopped in the veneer flow path to divert a piece of veneer from the veneer flow path and away from a belt.
Figure 12B:
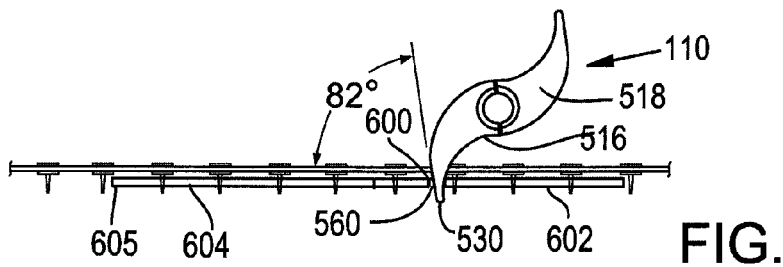
Figure 12C:
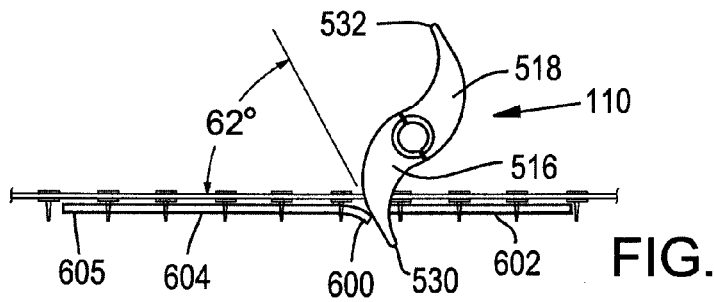
Figure 12D:
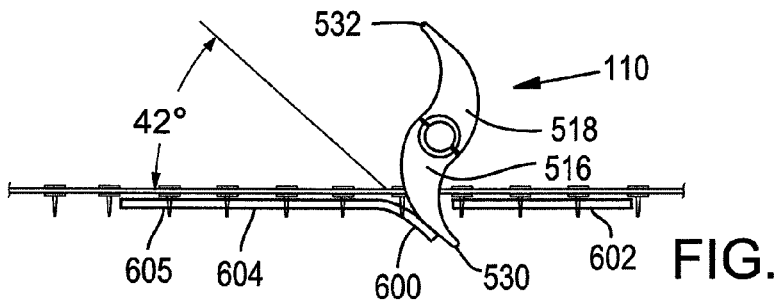
Figure 12E:
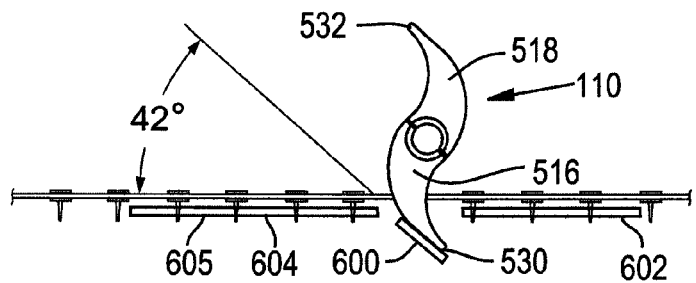
Figure 12F:
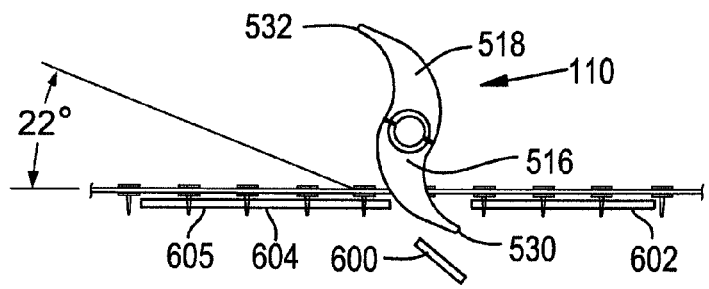
Figure 12G:
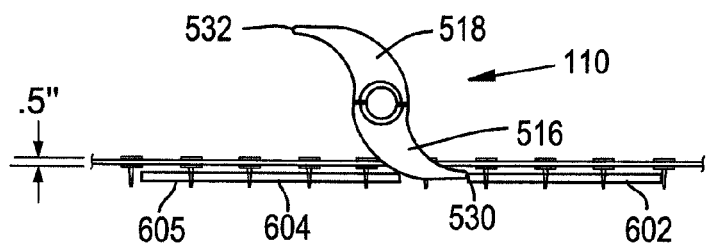
Figure 12H:
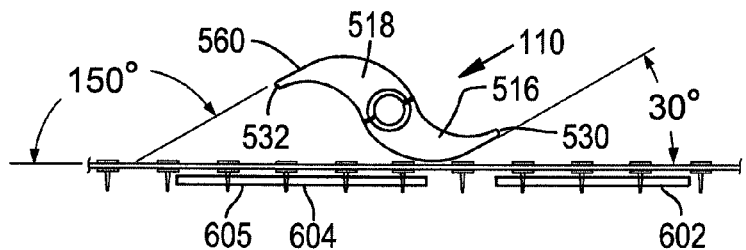
Figure 12I:
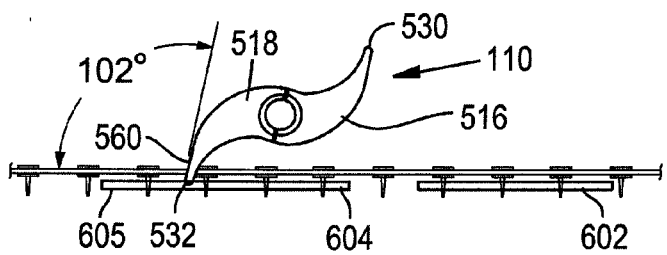
Figure 13A:
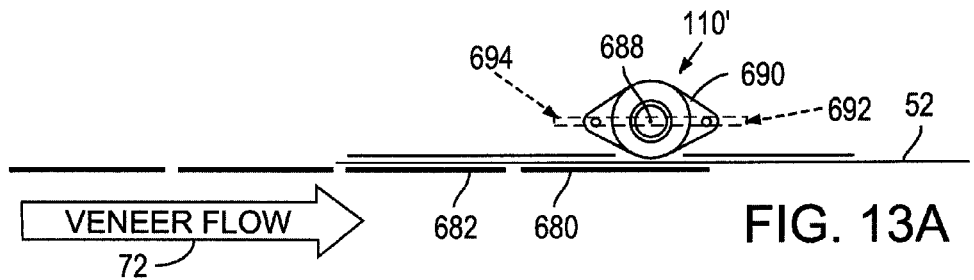
FIGS. 13A-13G illustrate the operation of an alternative form of veneer diverter.
Figure 13B:
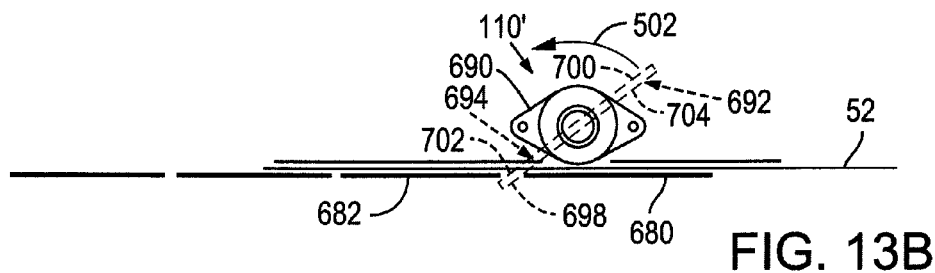
Figure 13C:
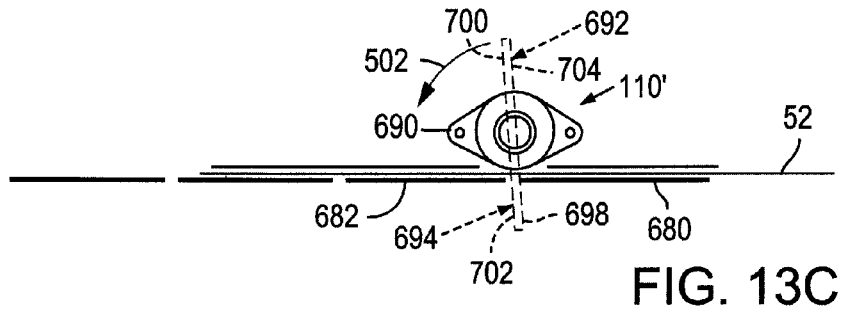
Figure 13D:
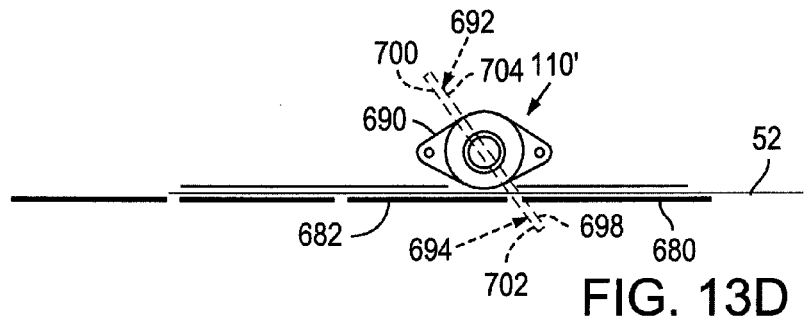
Figure 13E:
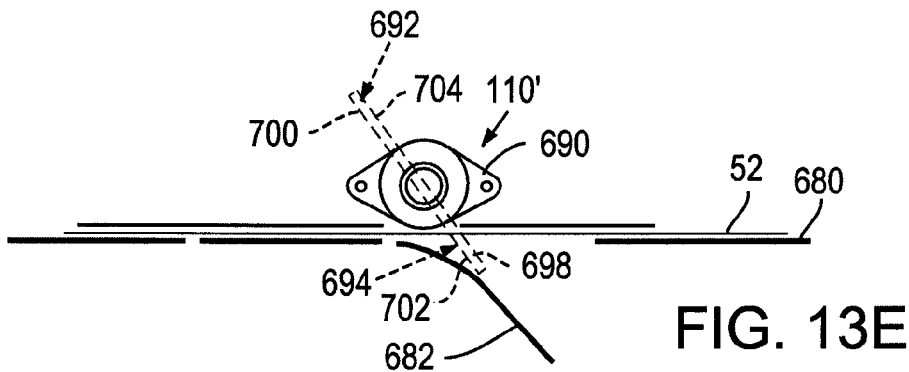
Figure 13F:
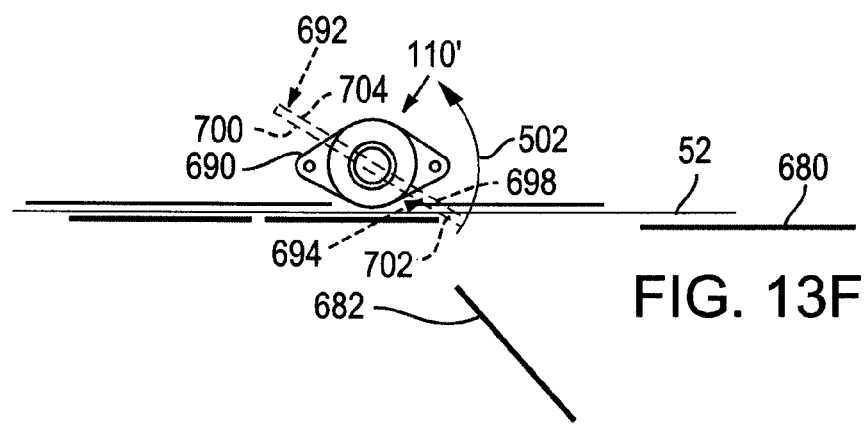
Figure 13G:
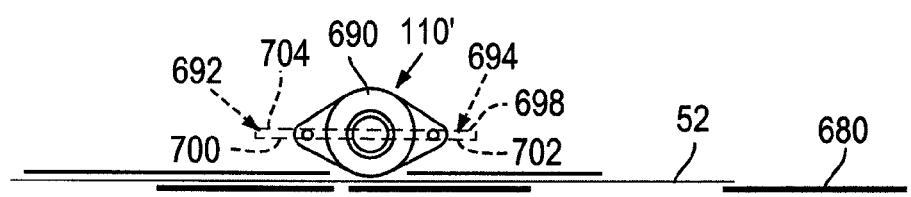

FIGS. 12A-12I illustrate a sequence wherein the set of diverters 110 are operated to divert a small piece of trash veneer 600 (e.g., a 2½ inch wide piece of veneer) that follows a random piece of veneer 602 and is followed by another random piece of veneer 604 and a piece of trash veneer 605 in the veneer flow path. In FIG. 12A, the leading edge of the trash veneer 600 has reached the location where the distal end 530 is entering the veneer flow stream. In this position, the distal end 530 of diverter 110 is in position to cross the veneer flow path as the diverter 110 is rotated in the direction of arrow 502. In FIG. 12A, the angle between the straight surface portion 560 of diverter section 516 and the upper surface of the belt is indicated at 102 degrees. The angles referenced below are also between the surface 560 and the upper surface of the belt with these angles changing as the veneer diverter is rotated. In FIG. 12B, the veneer diverter 110 has been rotated further so that the angle is now at 82 degrees and the dislodgement of the piece of veneer 600 from the belt has commenced. In FIG. 12C, the angle is now 62 degrees and further dislodgement of the trash veneer 600 has taken place. In FIG. 12D, the diverter 110 has been rotated to a stopping position where, in this example, the angle is 42 degrees. Again, further dislodgement of the piece 600 has taken place. In FIG. 12E, the angle has remained at 42 degrees with the piece 600 being directed by the diverter downwardly and away from the spikes and the belt. Since the downstream piece of veneer 604 following the trash piece 600 is another good random piece of veneer, the diverter 110 needs to be moved so as to not divert the piece 604 from the veneer flow path at the trash veneer diversion location. The diverter can be rotated such that the veneer engaging surface in the veneer flow path travels at the same speed as veneer through the veneer flow path. Thus, as can be seen if FIG. 12F, the diverter 110 has moved further with the distal end 530 traveling generally in the veneer flow direction and the angle now at 22 degrees. In FIG. 12G, the diverter has almost exited the veneer flow path. In FIG. 12H, the diverter has entirely left the diverter flow path and the angle between the surface 560 of the diverter section 518 and the belt is now at 150 degrees and the angle between the surface adjacent to the distal end 530 of diverter 516 and the belt is 30 degrees. The diverter can be held in this position as a random piece of veneer 604 passes the location of the diverter set 110. In this example, since the next piece of veneer 605 is another trash piece of veneer, as it approaches the diverter 110, the diverter is moved in FIG. 12I to the position shown in FIG. 12A to position the distal end 532 of the diverter in position to divert the trash piece of veneer 605. That is, the section 518 has been moved such that the angle between its surface 560 and the belt is now 102 degrees and the process repeats. If two successive pieces of veneer are trash veneer, the diverter 110 can be maintained in the position shown in FIGS. 12D and 12E until the successive pieces of trash veneer are diverted.

FIGS. 13-A-13G illustrate another form of diverter for moving veneer downwardly and away from belts such as belt 52. For purposes of discussion, assume the diverters shown in this figure are operated to divert trash veneer from the veneer flow stream and that a piece of random grade veneer 680 is held in engagement with belt 52 (and the other belts of the diverter not shown in these figures) followed by a piece of trash veneer 682. In FIG. 13A, the diverter set is labeled as 110' even though only one diverter is actually visible in this figure. The diverter of FIG. 13A comprises a plate 686 rotatable about an axis 688, for example, in the direction 502 as shown in FIG. 13B. The plate is rotatably mounted at its edges by respective mounts, one of which is indicated at 690 in FIG. 13A. A first veneer diverting projection or section 692 of the veneer diverter projects in one direction from center 688 and a second veneer diverting section 694 projects in the opposite direction from center 688. The projection 692 comprises a first planar surface 700 that leads in the direction of rotation and a second veneer engaging surface 704 that is also planar and that lags in the direction of rotation. End section 694 also includes a first surface 698, that can be planar, that leads in the direction of rotation and a second veneer engaging surface 702, that is also shown as a planar surface and that lags in the direction of rotation. As the veneer piece 680 passes the diverters 110' (see FIG. 13B), the diverter section 694 is rotated in position to intercept the trash veneer 682 to divert the trash veneer downwardly and away from the belt 52. As can be seen in FIG. 13B, the surface 702 is at an acute angle that is less than 45 degrees when the section 694 has been inserted between veneer pieces 680 and 682. With a planar shaped diverter as shown in FIG. 13B, it is more difficult to insert a diverter between veneer sheets especially as the speed of veneer travel along the belt increases. In testing, diverters of the form shown in FIGS. 13A-13G cannot be operated with veneer conveyor speeds as fast as diverters of the configuration shown in FIGS. 7-9. As continued rotation of the diverter occurs as shown in FIGS. 13C and 13D, the piece of veneer that is to be diverted away from the belt 52 has yet to be dislodged even though the diverter section 694 has passed a vertical position. When diverter 110' reaches a position shown in FIG. 13D, its rotation is stopped and the veneer engaging diverting surface 702 is in position to divert the trash veneer 682 away from the belt 52 as shown in FIG. 13E. FIG. 13F shows the trash veneer 682 traveling downwardly away from the belt 52 toward, for example, a trash haulback conveyor. Assuming the next piece of veneer 710 is not trash veneer in this example, in FIG. 13F the diverter 110 is rotated to shift diverter projection 694 out of the veneer flow path as shown in FIG. 13G. FIG. 13G shows the diverter 110' in the same position as shown in FIG. 13A except that the diverter section 692 is in a ready position to be rotated into the veneer flow path to intercept the next piece of trash veneer.

Figure 14:
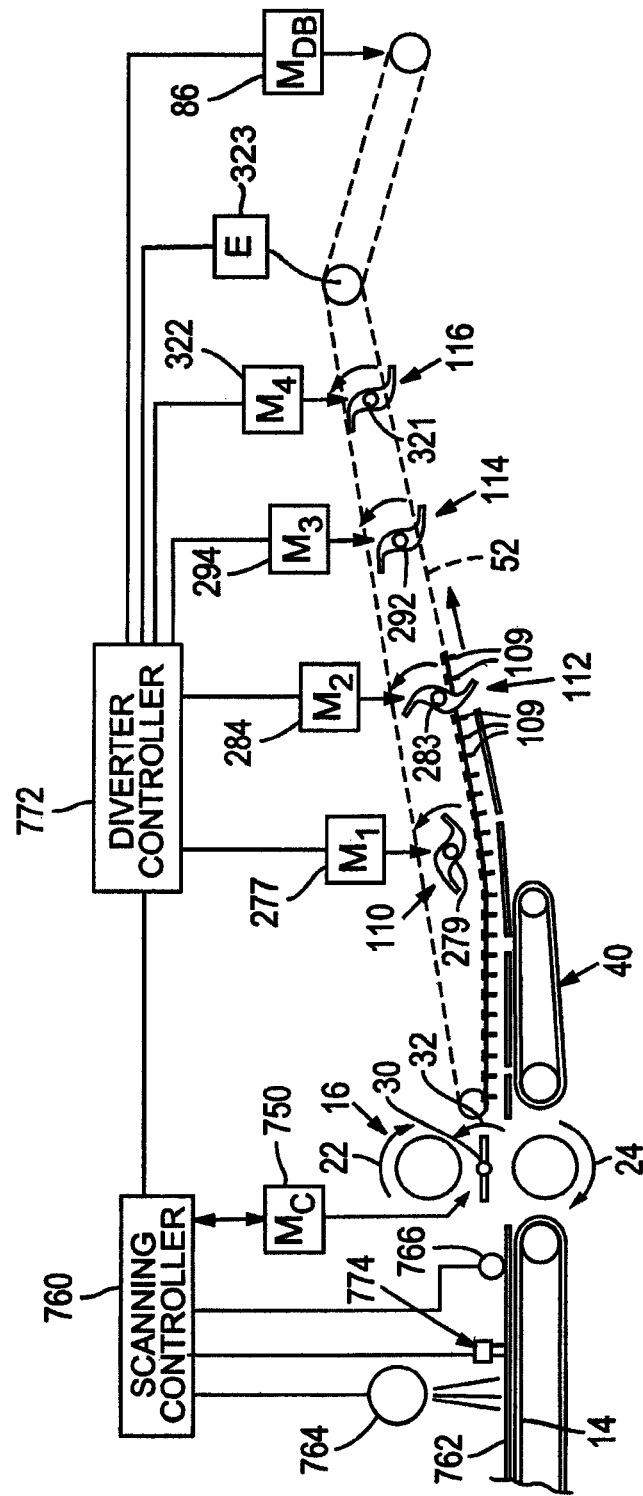
FIG. 14 illustrates an exemplary control approach for a wood veneer handling system and diverter in accordance with this disclosure.

With reference to FIG. 14, an exemplary control system for a wood veneer handling system described above is shown. In the system of FIG. 14, components like those discussed in connection with FIGS. 1 and 11 have been assigned like numbers and therefore will not be discussed in detail. The system illustrated in FIG. 14 does have four sets of diverters 110, 112, 114 and 116. Respective motors 277, 284, 294 and 322 control the position of the diverters 110, 112, 114 and 116 (or 110', 112' and 114' in FIG. 11) in response to motor control signals. In addition, a diverter drive belt motor 86 is shown coupled to the diverter belts (e.g., such as to belt 52 shown numbered in FIG. 14) to move these belts. Although a vacuum system can be used, spike belts including spikes 109 are shown in this schematic example. It should be noted that the spikes would impale the veneer and a vacuum would hold the veneer against the belts even though the veneer is shown spaced from the spikes in this example. In addition, a pinch belt mechanism 40 is shown for urging the veneer against the belts. The clipper 16 comprises a clipper blade 30 operable by a clipper motor 750 to cause the blade to rotate and complete a veneer clip. The blade is operable in a conventional manner to clip the veneer in response to a veneer clipping signal from a scanning controller 760 delivered to the motor 750. The scanning controller generates the clipping control signals in response to signals from a scanner that examines the veneer for defects. One example of an exemplary scanner and scanning controller is a Ventek New Vision model scanner system that is commercially available. Upon completion of a clip, a signal is returned to the scanning controller so that the scanning controller can track the precise location along a ribbon of veneer 762 at which the clip was made. The scanning controller comprises a processor that can be programmed as disclosed herein. The scanning controller 760 receives signals from a scanner 764 positioned to scan the ribbon of veneer 762 as it passes the scanner. The scanning controller determines the grade of veneer (full sheet, random, fishtail, trash, etc.) and provides diverter control output signals to control the rotation of the diverter shafts to sort the grades of the veneer. A position tracker, such as a roller 766 positioned to roll on the surface of the veneer ribbons 762 provides signals, for example pulses, to the scanning controller so that the scanning controller can track the position of the veneer that was scanned and the clipper for precisely controlling the veneer clips. Following the clipper, the veneer passes to a pinch belt mechanism 40 and is urged against the diverter belts including belt 52. The speed of the diverter belts and of the wood entering the clipper can be encoded and locked together so that the precise location of a clipped piece of a veneer on the belts is known. As the clipped veneer travels toward the plural sets of diverters 110, 112, 114 and 116, the scanning controller, because it knows the grade of the veneer of a particular clip from the scanning, provides diverter control signals to a diverter controller, which can be a PLC controller, that provides motor control signals in response to the diverter control signals from the scanner to control the various diverter motors in response to the diverter control signals. Diverter controller, for example, can control the belt motor 86 and can selectively control the respective diverter motors 277, 284, 294 and 322 to thereby control whether a particular piece of veneer is to be diverted downwardly away from the belts by a set of diverters. A shaft encoder 323 (labeled as E in FIG. 14) can be used to provide input to the diverter controller to enable the diverter controller and scanner controller to monitor the movement of the veneer carrying belts.

It should be noted that the pinch belt assembly 40 can be driven by a separate motor, for example, or by a clipper outfeed belt drive. The respective motors 277, 284, 294 and 322 can, for example, be servo motors coupled to the diverter controller 772 so that the diverter controller can precisely control the position of the respective veneer diverters of the sets 110, 112, 114 and 116. A sheet moisture detector can also be included as indicated at 774 for detecting the moisture content of the sheets to, for example, determine whether the wood is sapwood with a high moisture content. The scanner controller can send diverter control signals to the diverter controller for use in controlling the position of the veneer diverters 116 in the event sapwood is to be diverted from the belts by the diverter 116. This sapwood/non sapwood sort is simply one option as the diverters 116 can perform grade separation sorting or other full sheet sorting defined by the veneer mill.

A clipper scanner, such as a New Vision Scanner from Ventek, can provide, for example, 24 volt DC signals to selectively operate the diverters at the different divert points. The first divert point, corresponding to the position of veneer diverters 110, can be designated DV1 with divert points DV2 corresponding to a location of diverters 112, DV3 corresponding to location of diverters 114, and DV4 corresponding to location of diverters 116. Although other signals and configurations can be used, in one specific example, in response to a 24 volt DV1 signal from scanning controller 760, diverter controller 772 causes motor 277 to be energized to retract the diverters 278 to thereby pass fishtail, random veneer and full sheet veneer toward the other three divert points. In response to deenergization of the 24 volt divert control signal, the motor 277 is operated to rotate the veneer diverters into a position to divert or knock off trash pieces of veneer. The diverters can also be extended to their divert positions when there is no wood present. Wood that is diverted (knocked down) by the set of diverters 110 can fall onto a haulback conveyor and be transported to a chipper in the example of FIG. 1.

The second divert point DV2 has two modes of operation in this illustrative example. In mode 1, divert point DV2 is energized to retract the diverters 112 to allow random veneer and full sheet veneer to pass with the diverters 110 remaining retracted or out of the veneer flow stream as long as a 24 volt DC control signal is active (high). The divert point DV2 will be deenergized (the 24 volt DC signal output will be turned off) under conditions where there is no wood, trash or fishtail. Since trash wood is diverted by diverters 110, diverters 112 in effect separate fishtail from random and full sheet wood. As an alternative, divert point DV2 can be operated to only retract when full sheets are detected to allow the full sheets to pass. In this mode of operation, fishtail, trash and random veneer as well as no wood, will cause the DV2 signal to be turned off (deenergized) so that the diverters 112 are shifted to their divert position. In this case, any wood that reaches diverters 112, other than full sized sheets will be diverted. Since trash wood has been diverted by paddles 110, in this example fishtail and random veneer is separated by the diverters 112.

Divert point DV3 will be energized (the 24 volt output signal will be turned on to cause the diverters 114 to retract) at times when full sheets are reaching the divert point associated with the diverters 114. In this case, full sheets will pass the diverters 114. The DV3 signal is deenergized (turned off) under conditions of no wood, trash, fishtail and random veneer. In this case, the diverters 114 in essence divert random veneer from the belt as the diverters 110 have previously diverted trash veneer and the diverters 112 have previously diverted fishtail veneer.

The optional divert point DV4 associated with diverters 114, if provided, can be used to separate full sheets, for example, between two stackers. The sapwood signal from the scanner can be used as an input to the diverter controller 772 with the diverter controller controlling motor 322 based on the presence or absence of sapwood. The scanner controller can provide a pulsed signal output to the diverter controller for divert point DV3 that is energized (turned on) to indicate the leading edge of a full sheet. The pulsed output can stay on for an adjustable time, for example a minimum of 10 milliseconds to a maximum of 100 milliseconds. With the knowledge of the fact that a leading edge of a full sheet has reached diverters 114, and assuming the wood is sapwood or has another characteristic that is being sorted (e.g., knot size and number), the diverters 116 can be shifted to a divert position in response to signals from the diverter controller to cause the shifting of the diverters 116 to a position to divert the sapwood away from the belt. If the full sheet is not sapwood or not of another desired sorting grade, the diverters 116 can be retracted with the full sheet being passed to a different location. Thus, in the above system, the scanning controller controls the operation of the diverter controller based on scanning by the scanner. This is proven to be an extremely effective control approach. Other control approaches can alternatively be used. It should also be noted that the motors 277, 284, 294 and 322 can be operated to separate wood veneer by different categories and in different orders. For example, random veneer can be diverted ahead of fishtail veneer. However, it is typically more effective to first remove the trash veneer followed by other grades of veneer with the best graded veneer being removed last.

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the term includes has the same meaning as comprises.

Having illustrated and described the principles of our invention with reference to several illustrative embodiments, it should be apparent to those of ordinary skill in the art that the embodiments may be modified in arrangement and detail without departing from the inventive principles described herein. We claim all such modifications as fall within the scope of the following claims.

We claim:

1. A veneer handling apparatus comprising: a frame, a shaft rotatably coupled to the frame and rotatable through successive complete three hundred and sixty degree rotations in one direction of rotation about an axis of rotation, the axis of rotation being positioned above a veneer flow path along which veneer travels, at least one veneer engaging diverter supported by the shaft for rotation in said one direction of rotation to divert veneer downwardly from the veneer flow path, the veneer engaging diverter comprising an engager body portion having a central portion and first and second projecting end portions extending away from the central portion, the central portion comprising a shaft mount for coupling the veneer engager body portion to the rotatable shaft, the first projecting end portion comprising a first side edge that leads in the direction of rotation and a second side edge that lags in the direction of rotation upon rotation of the rotatable shaft in said one direction of rotation, the second projecting portion comprising a first side edge that leads in the direction of rotation and a second side edge that lags in the direction of rotation upon rotation of the rotatable shaft in said one direction of rotation, and wherein each of the second side edges comprises a curved surface portion, the first and second projecting end portions each respectively rotating in said one direction of rotation downwardly into the veneer flow path and upwardly out of the veneer flow path as the shaft completes each rotation in said one direction of rotation.

2. The apparatus according to claim 1, wherein the curved surface portion of each of the second side edges of each of the first and second projecting end portions comprises a convex surface portion, the second side edges of each of the projecting end portions being respectively positioned to divert veneer from the veneer flow path when the projecting end portion is rotated downwardly into the veneer flow path.

3. The apparatus according to claim 2, wherein the first side edges of each of the first and second projecting end portions comprise a concave surface portion, and the respective first and second side edges of the first and second projecting end portions converge toward one another moving away from the central portion and wherein the first and second projections extend in opposite directions away from the shaft mount.

4. The apparatus according to claim 1, wherein the veneer engaging diverter is generally S-shaped and wherein the first and second projecting end portions form the opposite ends of the S-shaped veneer engaging diverter.

5. The apparatus according to claim 1, wherein the first and second side edges of the projecting end portions each comprise a respective distal end and wherein the second side edges each include a straight edge portion adjacent to the distal end, the distal ends of the first and second projecting end portions being 180 degrees apart about the axis of rotation.

6. The apparatus according to claim 5, wherein the veneer engager is bifurcated through the central portion of the veneer engager body into first and second body sections, a portion of a first shaft receiving mount being positioned on the first body section and a portion of a second shaft receiving mount being positioned on the second body section, and wherein the first and second body sections extend in opposite directions from the axis of rotation.

7. The apparatus according to claim 6, wherein each of the distal ends are acute and formed by a respective first side edge that comprises a concave surface and a respective second side edge that comprises a convex surface, the first and second side edges converging toward one another moving toward the distal end portion.

8. The apparatus according to claim 1 comprising a plurality of said veneer engaging diverters coupled to the shaft, the diverters being aligned with one another along the shaft.

9. A veneer engaging diverter for diverting veneer from a veneer flow path, the veneer engaging diverter comprising an engager body portion having a central portion and first and second projecting end portions extending away from the central portion, the central portion comprising a shaft mount for coupling the veneer engager body portion to a rotatable shaft, the first projecting end portion comprising a first side edge that leads in the direction of rotation and a second side edge that lags in the direction of rotation upon rotation of the rotatable shaft in one direction, the second projecting portion comprising a first side edge that leads in the direction of rotation and a second side edge that lags in the direction of rotation upon rotation of the rotatable shaft in said one direction, and wherein each of the first and second projecting end portions comprises a distal end portion configured to intersect a veneer flow path at an angle of between 75 degrees and 105 degrees when the distal end portion is rotated into the veneer flow path.

10. The apparatus according to claim 9, wherein the angle of entry is approximately 90 degrees.

11. The apparatus according to claim 9, wherein the diverters comprise a generally S-shaped diverter body comprising first and second diverter projections.

12. The apparatus according to claim 9 wherein each of the second side edges comprises a convex surface portion and each of the first side edges comprises a concave surface portion, and wherein each of the second side edges includes a straight edge portion adjacent to the distal end.

13. A veneer engaging diverter for diverting veneer from a veneer flow path, the veneer engaging diverter comprising an engager body portion having a central portion and first and second projecting end portions extending away from the central portion, the first projecting end portion comprising a first distal end spaced from the central portion and the second projecting end portion comprising a second distal end spaced from the central portion, the first and second distal ends having a reduced width compared to the width of the central portion, the central portion comprising a shaft mount for coupling the veneer engager body portion to a rotatable shaft, the first projecting end portion comprising a first side edge that leads in the direction of rotation and a second side edge that lags in the direction of rotation upon rotation of the rotatable shaft in one direction, the second projecting portion comprising a first side edge that leads in the direction of rotation and a second side edge that lags in the direction of rotation upon rotation of the rotatable shaft in said one direction, wherein each of the second side edges comprises a curved surface portion, and wherein the shaft mount is positioned between the first and second distal ends.

14. The apparatus according to claim 13, wherein the diverters comprise a generally S-shaped diverter body comprising first and second diverter projections and wherein the first and second projecting end portions are at the opposite ends of the S-shaped veneer engaging diverter.

15. The apparatus according to claim 13, wherein the curved surface portion of each of the second side edges comprises a convex surface portion.

16. The apparatus according to claim 13, wherein the first and second side edges of the first projecting end portion converge moving from the central portion toward the first distal end and the first and second side edges of the second projecting end portion converge moving from the central portion toward the second distal end, the first and second distal ends being spaced 180 degrees apart from one another in the direction of rotation.

17. The apparatus according to claim 13, wherein the veneer engager is generally S-shaped and wherein the first and second projecting end portions are at the opposite ends of the S-shaped veneer engaging diverter.

18. The apparatus according to claim 14, wherein the first and second projecting end portions each comprise a distal end, the distal ends being positioned 180 degrees apart from one another, and wherein the second side edges each include a straight edge portion adjacent to the distal end.

19. The apparatus according to claim 18, wherein the veneer engager is bifurcated through the central portion of the veneer engager body into first and second body sections, a portion of a first shaft receiving mount being positioned on the first body section and a portion of a second shaft receiving mount being positioned on the second body section, wherein the first and second body sections extend away from the shaft mount in opposite directions from one another.

20. The apparatus according to claim 13, wherein the first and second distal ends each is in the form of a rounded point.

21. The apparatus according to claim 14 in combination with a shaft and comprising a plurality of said veneer engaging diverters coupled to the shaft, the diverters being aligned with one another along the shaft.

* * * * *